(12) United States Patent
Motohashi

(10) Patent No.: US 12,625,603 B2
(45) Date of Patent: May 12, 2026

(54) POINT CLOUD PROCESSING APPARATUS, POINT CLOUD PROCESSING METHOD, NON-TRANSITORY RECORDING MEDIUM, AND POINT CLOUD PROCESSING SYSTEM

(71) Applicant: Naoki Motohashi, Kanagawa (JP)

(72) Inventor: Naoki Motohashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 339 days.

(21) Appl. No.: 18/472,745

(22) Filed: Sep. 22, 2023

(65) Prior Publication Data

US 2024/0111407 A1 Apr. 4, 2024

(30) Foreign Application Priority Data

Sep. 30, 2022 (JP) ................................. 2022-157818
Aug. 4, 2023 (JP) ................................. 2023-127934

(51) Int. Cl.
*G06F 3/0482* (2013.01)
*G06F 3/04847* (2022.01)
*G06T 19/00* (2011.01)

(52) U.S. Cl.
CPC ........ *G06F 3/04847* (2013.01); *G06F 3/0482* (2013.01); *G06T 19/00* (2013.01); *G06T 2200/24* (2013.01); *G06T 2210/56* (2013.01)

(58) Field of Classification Search
CPC ............................................... G06F 3/048–05
See application file for complete search history.

(56) References Cited

U.S. PATENT DOCUMENTS 10,459,706 B1 * 10/2019 Little ......................... G06F 8/51
11,893,318 B1 * 2/2024 Jensen ..................... G06F 30/23

2011/0271217 A1 * 11/2011 Cruz Moreno ....... G06F 3/0482
715/765
2012/0260166 A1 * 10/2012 Cipollo ............... G06F 3/04883
715/716
2013/0106849 A1 * 5/2013 Ha ........................... G06T 5/77
382/260
2013/0293532 A1 * 11/2013 Vaddadi ................ G06T 15/005
345/419

(Continued)

FOREIGN PATENT DOCUMENTS

JP 2001-243500 A 9/2001
JP 2017-211824 A 11/2017

(Continued)

OTHER PUBLICATIONS

Extended European Search Report for EP23200093.5 mailed on Mar. 18, 2024.
Girardeau-Montaut Daniel, "CloudCompare Version 2.6.1 User manual", Jan. 20, 2020, pp. 1-181, URL: https://web/archive.org/web/20220120143436/http://www.danielgm.net/cc/doc/qCC/CloudCompare%20v2.6.1%20-%20User%20manual.pdf, retrieved on Mar. 4, 2024.

(Continued)

*Primary Examiner* — Daniel Rodriguez
(74) *Attorney, Agent, or Firm* — IPUSA, PLLC

(57) ABSTRACT

A point cloud processing apparatus includes circuitry to generate a selection screen displaying a plurality of options each of which indicates a corresponding one of a plurality of qualities for point cloud processing that is performed on point cloud data representing a three-dimensional point cloud. The circuitry stores, in a memory, a processing result of the point cloud processing performed with one of the plurality of qualities on the point cloud data. The one of the plurality of qualities is a selected one of the plurality of options.

20 Claims, 21 Drawing Sheets

(56)        References Cited

U.S. PATENT DOCUMENTS

| | | | | |
|---|---|---|---|---|
| 2015/0039104 A1* | 2/2015 | Nakatani | ............. | H04L 12/2818 |
| | | | | 700/83 |
| 2018/0130255 A1* | 5/2018 | Hazeghi | ............... | H04N 13/271 |
| 2020/0132822 A1* | 4/2020 | Pimentel | ................. | G01S 17/89 |
| 2020/0209009 A1* | 7/2020 | Zhang | ................. | G06F 3/04815 |
| 2021/0264666 A1* | 8/2021 | Chosid | .................... | G06T 17/05 |
| 2022/0114786 A1* | 4/2022 | Zhang | .................... | G06N 3/088 |
| 2023/0104977 A1* | 4/2023 | Zaghetto | ............. | H04N 19/597 |
| | | | | 375/240.02 |
| 2023/0222729 A1 | 7/2023 | Motohashi | | |
| 2023/0377299 A1* | 11/2023 | Becker | ................... | G06T 17/20 |

FOREIGN PATENT DOCUMENTS

| | | |
|---|---|---|
| JP | 2018-144160 A | 9/2018 |
| JP | 2023-102935 A | 7/2023 |

OTHER PUBLICATIONS

Tobias Monch et al., "Interactive Mesh Smoothing for Medical Applications", Computer Graphics Forum, Journal of the European Association for Computer Graphics, Wiley-Blackwell, Oxford, vol. 32, No. 8, Jul. 30, 2013, pp. 110-121.

Gimp, "Median Blur", Nov. 12, 2020, pp. 1-4, URL: https://web.archive.org/web/20201112002932/https://docs.gimp.org/2.10/de/gimp-filter-median-blur.html, retrieved on Mar. 5, 2024.

Gimp Forum, "Focus Blur and Lens Blur", Jun. 13, 2020, pp. 1-2, URL: https://www.gimp-forum.net/Thread-Focus-Blur-and Lens-Blur, retrieved on Mar. 5, 2024.

Gimp, "Misc. Dialogs—Tool Presets Dialog", Mar. 14, 2022, URL: https://web.archive.org/web/20220314203104/https://docs.gimp.org/2.10/en/gimp-dialogs-misc.html#gimp-tool-preset-dialog, retrieved on Mar. 5, 2024.

* cited by examiner

POINT CLOUD PROCESSING SYSTEM 1

MANAGEMENT SERVER 5

100

COMMUNICATION NETWORK

TERMINAL APPRATUS 3

FIG. 4

| PROCESSING RESULT TYPE | QUALITY | PROCESSING ORDER 1 | PROCESSING ORDER 2 | PROCESSING ORDER 3 | PROCESSING ORDER 4 |
|---|---|---|---|---|---|
| MERGED POINT CLOUD | QUALITY 1 | REGISTRATION | NOISE REMOVAL (REMOVAL RATE : HIGH) | | |
| | QUALITY 2 | REGISTRATION | NOISE REMOVAL (REMOVAL RATE : MEDIUM) | | |
| | QUALITY 3 | REGISTRATION | NOISE REMOVAL (REMOVAL RATE : LOW) | | |
| MESH, TEXTURE | QUALITY 1 | REGISTRATION | NOISE REMOVAL (REMOVAL RATE : HIGH) | MESH GENERATION (HOLE DENSITY : HIGH, FLATNESS LEVEL : MEDIUM) | TEXTURE MAPPING (SEAM SURFACE DISCREPANCY : LOW) |
| | QUALITY 2 | REGISTRATION | NOISE REMOVAL (REMOVAL RATE : MEDIUM) | MESH GENERATION (HOLE DENSITY : MEDIUM, FLATNESS LEVEL : LOW) | TEXTURE MAPPING (SEAM SURFACE DISCREPANCY : HIGH) |
| | QUALITY 3 | REGISTRATION | NOISE REMOVAL (REMOVAL RATE : LOW) | MESH GENERATION (HOLE DENSITY : LOW, FLATNESS LEVEL : HIGH) | TEXTURE MAPPING (SEAM SURFACE DISCREPANCY : MEDIUM) |
| 3D MODEL | QUALITY 1 | REGISTRATION | NOISE REMOVAL (REMOVAL RATE : HIGH) | SEGMENTATION | MODEL FITTING (MODEL GENERATION VOLUME : HIGH) |
| | QUALITY 2 | REGISTRATION | NOISE REMOVAL (REMOVAL RATE : MEDIUM) | SEGMENTATION | MODEL FITTING (MODEL GENERATION VOLUME : MEDIUM) |
| | QUALITY 3 | REGISTRATION | NOISE REMOVAL (REMOVAL RATE : LOW) | SEGMENTATION | MODEL FITTING (MODEL GENERATION VOLUME : LOW) |

FIG. 11A

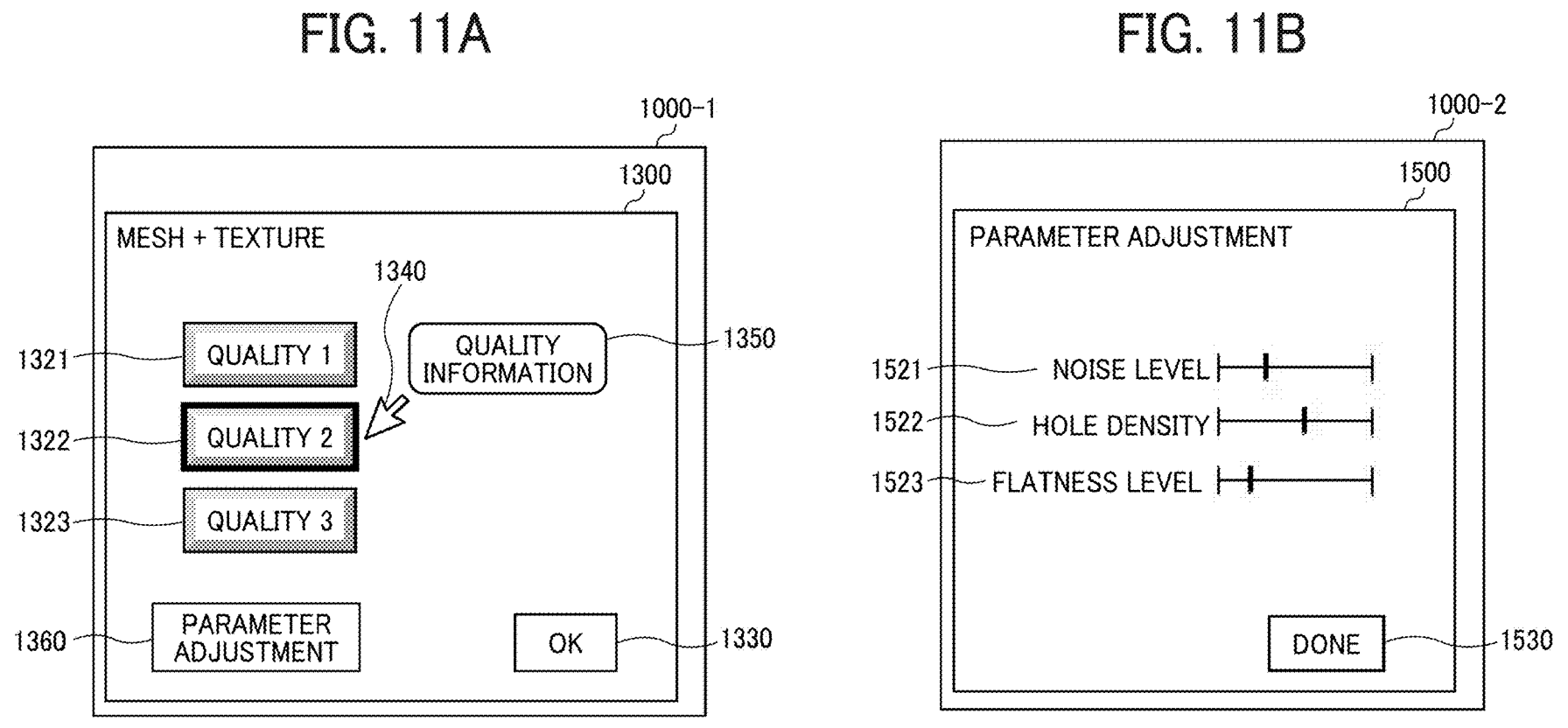

MESH + TEXTURE

QUALITY 1 — 1321
QUALITY 2 — 1322
QUALITY 3 — 1323

1340

QUALITY INFORMATION — 1350

PARAMETER ADJUSTMENT — 1360

PARAMETER ADJUSTMENT

NOISE LEVEL — 1521
HOLE DENSITY — 1522
FLATNESS LEVEL — 1523

DONE — 1530

| PROCESSING RESULT TYPE | QUALITY | PROCESSING RESULT TYPE INFORMATION/QUALITY INFORMATION |
|---|---|---|
| MERGED POINT CLOUD | | POINT CLOUD REPRESENTATION GENERATED BY ALIGNING POINT CLOUDS CAPTURED AT A PLURALITY OF LOCATIONS |
| | QUALITY 1 | NOISE REMOVAL RATE : HIGH |
| | QUALITY 2 | NOISE REMOVAL RATE : MEDIUM |
| | QUALITY 3 | NOISE REMOVAL RATE : LOW |
| MESH, TEXTURE | | REPRESENTATION BY APPLYING SURFACE (MESH) TO MERGED POINT CLOUD AND OVERLAYING IMAGES ON SURFACE |
| | QUALITY 1 | (NOISE REMOVAL RATE : HIGH,) HOLE DENSITY : HIGH, FLATNESS LEVEL : MEDIUM, SEAM SURFACE DISCREPANCY : LOW |
| | QUALITY 2 | (NOISE REMOVAL RATE : MEDIUM,) HOLE DENSITY : MEDIUM, FLATNESS LEVEL : LOW, SEAM SURFACE DISCREPANCY : HIGH |
| | QUALITY 3 | (NOISE REMOVAL RATE : LOW,) HOLE DENSITY : LOW, FLATNESS LEVEL : HIGH, SEAM SURFACE DISCREPANCY : MEDIUM |
| 3D MODEL | | REPRESENTATION BY REPLACING POINT CLOUD WITH BASIC GEOMETRIC SHAPE (GEOMETRIC MODEL) SUCH AS CYLINDER OR CUBOID |
| | QUALITY 1 | (NOISE REMOVAL RATE : HIGH,) MODEL GENERATION VOLUME : HIGH |
| | QUALITY 2 | (NOISE REMOVAL RATE : MEDIUM,) MODEL GENERATION VOLUME : MEDIUM |
| | QUALITY 3 | (NOISE REMOVAL RATE : LOW,) MODEL GENERATION VOLUME : LOW |

FIG. 16

| FIG. 16A |
| FIG. 16B |
| FIG. 16C |

FIG. 16A

| PROCESSING RESULT TYPE | QUALITY/APPLICATION | PROCESSING ORDER 1 | PROCESSING ORDER 2 | PROCESSING ORDER 3 | PROCESSING ORDER 4 | PROCESSING ORDER 5 |
|---|---|---|---|---|---|---|
| MERGED POINT CLOUD | QUALITY 1 | REGISTRATION | NOISE REMOVAL (REMOVAL RATE : HIGH) | | | |
| | QUALITY 2 | REGISTRATION | NOISE REMOVAL (REMOVAL RATE : MEDIUM) | | | |
| | QUALITY 3 | REGISTRATION | NOISE REMOVAL (REMOVAL RATE : LOW) | | | |
| | SHARING | REGISTRATION | NOISE REMOVAL (REMOVAL RATE : LOW) | - | - | - |
| | MEASUREMENT | REGISTRATION | NOISE REMOVAL (REMOVAL RATE : HIGH) | - | - | - |
| | SIMULATION | REGISTRATION | SEGMENTATION (CATEGORY : LOADING AND UNLOADING AREA) | NOISE REMOVAL (REMOVAL RATE FOR LOADING AND UNLOADING AREA : HIGH) | - | - |

FIG. 16B

| MESH, TEXTURE | | | | | | |
|---|---|---|---|---|---|---|
| | QUALITY 1 | REGISTRATION | NOISE REMOVAL (REMOVAL RATE : HIGH) | MESH GENERATION (HOLE DENSITY : HIGH, FLATNESS LEVEL : MEDIUM) | TEXTURE MAPPING (SEAM SURFACE DISCREPANCY : LOW) | |
| | QUALITY 2 | REGISTRATION | NOISE REMOVAL (REMOVAL RATE : MEDIUM) | MESH GENERATION (HOLE DENSITY : MEDIUM, FLATNESS LEVEL : LOW) | TEXTURE MAPPING (SEAM SURFACE DISCREPANCY : HIGH) | |
| | QUALITY 3 | REGISTRATION | NOISE REMOVAL (REMOVAL RATE : LOW) | MESH GENERATION (HOLE DENSITY : LOW, FLATNESS LEVEL : HIGH) | TEXTURE MAPPING (SEAM SURFACE DISCREPANCY : MEDIUM) | |
| | SHARING | REGISTRATION | NOISE REMOVAL (REMOVAL RATE : LOW) | MESH GENERATION (COMPLETENESS LEVEL : HIGH) | TEXTURE MAPPING (NUMBER OF USED IMAGES : MANY) | — |
| | MEA-SURE-MENT | REGISTRATION | NOISE REMOVAL (REMOVAL RATE : HIGH) | MESH GENERATION (COMPLETENESS LEVEL : HIGH) | TEXTURE MAPPING (NUMBER OF USED IMAGES : MANY) | — |
| | SIMULA-TION | REGISTRATION | SEGMENTATION (CATEGORY : LOADING AND UNLOADING AREA) | NOISE REMOVAL (REMOVAL RATE FOR LOADING AND UNLOADING AREA : HIGH) | MESH GENERATION (COMPLETENESS LEVEL : HIGH) | TEXTURE MAPPING (NUMBER OF USED IMAGES : MANY) |

FIG. 16C

| 3D MODEL | | | | |
|---|---|---|---|---|
| QUALITY 1 | REGIS-TRATION | NOISE REMOVAL (REMOVAL RATE : HIGH) | SEGMENTATION | MODEL FITTING (MODEL GENERATION VOLUME : HIGH) |
| QUALITY 2 | REGIS-TRATION | NOISE REMOVAL (REMOVAL RATE : MEDIUM) | SEGMENTATION | MODEL FITTING (MODEL GENERATION VOLUME : MEDIUM) |
| QUALITY 3 | REGIS-TRATION | NOISE REMOVAL (REMOVAL RATE : LOW) | SEGMENTATION | MODEL FITTING (MODEL GENERATION VOLUME : LOW) |
| SHARING | REGIS-TRATION | NOISE REMOVAL (REMOVAL RATE : LOW) | SEGMENTATION (NUMBER OF CATEGORIES : MEDIUM) | MODEL FITTING (MODEL GENERATION VOLUME : MEDIUM) |
| MEA-SURE-MENT | REGIS-TRATION | NOISE REMOVAL (REMOVAL RATE : LOW) | SEGMENTATION (NUMBER OF CATEGORIES : FEW) | MODEL FITTING (MODEL GENERATION VOLUME : MEDIUM) |
| SIMULA-TION | REGIS-TRATION | NOISE REMOVAL (REMOVAL RATE : LOW) | SEGMENTATION (NUMBER OF CATEGORIES : MANY) | MODEL FITTING (MODEL GENERATION VOLUME : HIGH) |

FIG. 17

| FIG. 17A |
|---|
| FIG. 17B |

FIG. 17A

| PROCESSING RESULT TYPE | QUALITY/APPLICATION | PROCESSING RESULT TYPE INFORMATION/QUALITY INFORMATION |
|---|---|---|
| MERGED POINT CLOUD | | POINT CLOUD REPRESENTATION GENERATED BY ALIGNING POINT CLOUDS CAPTURED AT A PLURALITY OF POSITIONS |
| | QUALITY 1 | NOISE REMOVAL RATE : HIGH |
| | QUALITY 2 | NOISE REMOVAL RATE : MEDIUM |
| | QUALITY 3 | NOISE REMOVAL RATE : LOW |
| | SHARING | NUMBER OF POINTS IS INCREASED TO RAISE VISIBILITY |
| | MEASURE-MENT | NOISE POINT CLOUD INAPPROPRIATE FOR MEASUREMENT IS REMOVED |
| | SIMULATION | NOISE AT LOADING AND UNLOADING AREA FOR OBJECT IS PREFERENTIALLY REMOVED |
| MESH, TEXTURE | | REPRESENTATION BY APPLYING SURFACE (MESH) TO MERGED POINT CLOUD AND OVERLAYING IMAGES ON SURFACE |
| | QUALITY 1 | (NOISE REMOVAL RATE : HIGH,) HOLE DENSITY : HIGH, FLATNESS LEVEL : MEDIUM, SEAM SURFACE DISCREPANCY : LOW |
| | QUALITY 2 | (NOISE REMOVAL RATE : MEDIUM,) HOLE DENSITY : MEDIUM, FLATNESS LEVEL : LOW, SEAM SURFACE DISCREPANCY : HIGH |

FIG. 17B

| | | |
|---|---|---|
| | QUALITY 3 | (NOISE REMOVAL RATE : LOW,) HOLE DENSITY : LOW, FLATNESS LEVEL : HIGH, SEAM SURFACE DISCREPANCY : MEDIUM |
| | SHARE | THERE IS LITTLE SURFACE MISSING AND DISTORTION TO RAISE VISIBILITY |
| | MEASURE-MENT | INAPPROPRIATE NOISE POINT CLOUD IS REMOVED AND MORE ACCURATE SHAPE IS REPRESENTED |
| | SIMULATION | NOISE AT LOADING AND UNLOADING AREA FOR OBJECT IS PREFERENTIALLY REMOVED |
| 3D MODEL | | REPRESENTATION BY REPLACING POINT CLOUD WITH BASIC GEOMETRIC SHAPE (GEOMETRIC MODEL) SUCH AS CYLINDER OR CUBOID |
| | QUALITY 1 | (NOISE REMOVAL RATE : HIGH,) MODEL GENERATION VOLUME : HIGH |
| | QUALITY 2 | (NOISE REMOVAL RATE : MEDIUM,) MODEL GENERATION VOLUME : MEDIUM |
| | QUALITY 3 | (NOISE REMOVAL RATE : LOW,) MODEL GENERATION VOLUME : LOW |
| | SHARING | SIGNIFICANT OBJECT REPRESENTING SPACE IS MODELED TO RAISE VISIBILITY |
| | MEASURE-MENT | ONLY OBJECT(S) USED FOR MEASUREMENT ARE MODELED (FOR EXAMPLE, STRUCTURAL ELEMENTS SUCH AS WALL AND CEILING) |
| | SIMULATION | ALL OBJECTS USED FOR SIMULATION ARE MODELED (IN THE CASE OF AIR FLOW SIMULATION,ALL OBJECTS HIT BY AIR FLOW, AND IN THE CASE OF LOADING AND UNLOADING SIMULATION, ONLY ENTRANCE FOR OBJECTS TO PASS THROUGH) |

POINT CLOUD PROCESSING APPARATUS, POINT CLOUD PROCESSING METHOD, NON-TRANSITORY RECORDING MEDIUM, AND POINT CLOUD PROCESSING SYSTEM

CROSS-REFERENCE TO RELATED APPLICATIONS

This patent application is based on and claims priority pursuant to 35 U.S.C. § 119(a) to Japanese Patent Application Nos. 2022-157818, filed on Sep. 30, 2022, and 2023-127934, filed on Aug. 4, 2023, in the Japan Patent Office, the entire disclosure of which is hereby incorporated by reference herein.

BACKGROUND

Technical Field

The present disclosure relates to a point cloud processing apparatus, a point cloud processing method, a non-transitory recording medium, and a point cloud processing system.

Related Art

A three-dimensional point cloud data processing apparatus is provided with a feature point extracting unit including an area calculating mechanism and an area comparing mechanism, a binary image generating unit including a projecting mechanism for projecting a feature point cloud onto a curved surface, a lattice setting mechanism for forming a lattice on the curved surface, a multi-valued image generating mechanism on lattice points, and a binarizing mechanism, and a point cloud data thinning unit including a reduction degree adjusting mechanism for thinning points from the point cloud at an equal ratio.

SUMMARY

According to an embodiment of the disclosure, a point cloud processing apparatus includes circuitry to generate a selection screen displaying a plurality of options each of which indicates a corresponding one of a plurality of qualities for point cloud processing that is performed on point cloud data representing a three-dimensional point cloud. The circuitry stores, in a memory, a processing result of the point cloud processing performed with one of the plurality of qualities on the point cloud data. The one of the plurality of qualities is a selected one of the plurality of options.

According to an embodiment of the disclosure, a point cloud processing method includes generating a selection screen displaying a plurality of options each of which indicates a corresponding one of a plurality of qualities for point cloud processing that is performed on point cloud data representing a three-dimensional point cloud. The method includes storing a processing result of the point cloud processing performed with one of the plurality of qualities on the point cloud data. The one of the plurality of qualities is a selected one of the plurality of options.

According to an embodiment of the disclosure, a non-transitory recording medium storing a plurality of instructions which, when executed by one or more processors, causes the one or more processors to perform the above-described method.

According to an embodiment of the disclosure, a point cloud processing system includes the above-described point cloud processing apparatus and a terminal apparatus communicably connected to the point cloud processing apparatus. The circuitry of the point cloud processing apparatus further transmits selection screen information indicating the selection screen to the terminal apparatus. The terminal apparatus includes additional circuitry to receive the selection screen information transmitted from the point cloud processing apparatus and displays, on a display, the selection screen.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a conceptual diagram illustrating a setting information management table according to an embodiment of the present disclosure;

FIGS. 11A and 11B are diagrams illustrating a selection screen and an adjustment screen, respectively, according to an embodiment of the present disclosure;

FIG. 12 is a diagram illustrating quality information according to an embodiment of the present disclosure;

FIG. 16 including FIGS. 16A to 16C is a conceptual diagram illustrating a setting information management table according to the modification illustrated in FIGS. 15A to 15C;

FIG. 17 including FIGS. 17A and 17B is a diagram illustrating processing result type information and quality information according to the modification illustrated in FIGS. 15A to 15C.

Figure 1:
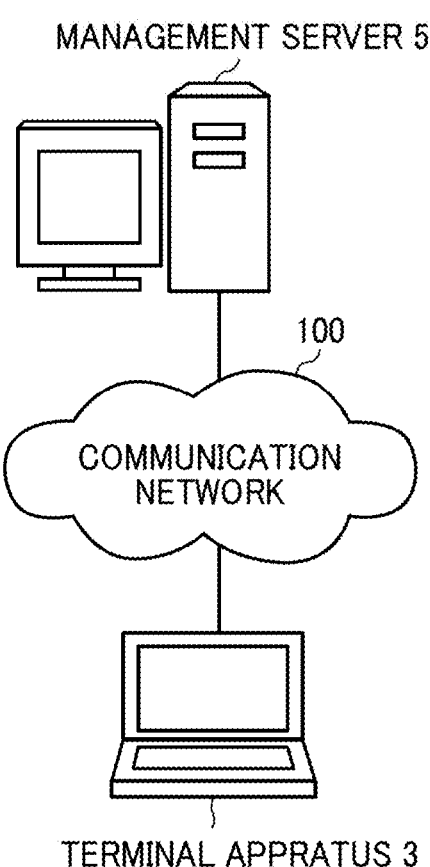
FIG. 1 is a diagram illustrating an overall configuration of a point cloud processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the fields of civil engineering and architecture, the implementation of building information modeling (BIM)/construction information modeling (CIM) has been promoted for coping with, for example, the demographic shift towards an older population and enhancing labor efficiency and productivity.

BIM is a solution that involves utilizing a database of buildings, in which attribute data such as cost, finishing details, and management information, is added to a three-dimensional (3D) digital model of a building. This model is created on a computer and utilized throughout every stage of the architectural process, including design, construction, and maintenance. The three-dimensional digital model is referred to as a 3D model in the following description.

CIM is a solution that has been proposed for the field of civil engineering (covering general infrastructure such as roads, electricity, gas, water supply, etc.) following BIM that has been advancing in the field of architecture. CIM is being pursued, similar to BIM, to aim for efficiency and advancement in a series of construction production systems by sharing information through centralized 3D models among participants.

A matter of concern for promoting BIM/CIM implementation is how to easily obtain 3D information on spatial aspects of a building or a public facility. The "3D information" used in the following description refers to, for example, a three-dimensional point cloud retaining distance information of a space acquired by, for example, a laser scanner, a mesh object generated based on point cloud data representing a three-dimensional point cloud, or a 3D Computer Aided Design (3DCAD) model. In the following description, the three-dimensional point cloud may also be referred to as a point cloud, and the laser scanner is also referred to as an LS.

When a structure is constructed from the beginning, for example, BIM/CIM software can be used to design a completed structure from the beginning, so that BIM/CIM can be easily introduced. On the other hand, regarding the existing buildings, there is a case where, for example, a design drawing at the time of construction does not remain, or a current situation is different from a drawing at the time of design due to modification with the lapse of time, and the barriers for the BIM/CIM implementation are high. Such BIM implementation for an existing building is called "As-Build BIM," and is an issue for promoting the BIM/CIM implementation going forward.

As a way to achieve the As-Build BIM, there is a workflow of performing spatial measurement using the above-described LS and creating a 3DCAD model from point cloud data obtained by the spatial measurement. This task has been performed in the related art by using, for example, a method of measuring with photographs, a method of measuring manually, or a method of sketching by hand. However, in such an approach by using the known method described above, significant costs may arise due to factors such as a size of a space, the presence of an object in a space, or the complexity of a space (for example, the complexity of pipe arrangement). As an effective way to address such an issue, the introduction of an LS that acquires 3D information on a space has been gaining attention.

In the Ad-Build using the LS, acquisition of the 3D information is facilitated, however, a work of point cloud processing performed on point cloud data, which has not been present in the known art, newly arises. In typical point cloud processing, for example, "multipoint measurement using LS," "generation of a merged point cloud through alignment of individual point clouds," "removal of unnecessary points (an unnecessary point cloud) such as noise," "mesh conversion of a point cloud, texture-mapping to a mesh, and 3DCAD model conversion" are performed.

The above-described processing is performed using commercially available point cloud processing software. However, the point cloud processing software has multiple functions, and many parameters are to be configured for each of the multiple functions. The barriers for handling such commercially available point cloud processing software for a user without knowledge or experience in point cloud processing are high.

Some point cloud processing software has a mode that automatically performs various functions. However, an issue such as failing to perform such automation in the case of the presence of an area where a point cloud has not been obtained is also emerging. In such a case, post-processing taking effort and man-hours such as manually modifying an inappropriate area by comparing a point cloud and a photograph arises.

According to an embodiment of the present disclosure, point cloud processing with desired quality is performable regardless of the user, even a user who is an unskilled person with little experience in point cloud processing.

According to an embodiment of the present disclosure, in the case where post-processing arises after point cloud processing is performed since the quality of the point cloud processing failed to meet the desired quality, the post-processing can be reduced.

FIG. 1 is a diagram illustrating an overall configuration of a point cloud processing system according to an embodiment of the present disclosure. A point cloud processing system 1 according to the present embodiment includes a terminal apparatus 3, which is a type of a communication terminal, and a management server 5.

The management server 5 serves as a point cloud processing apparatus that performs one or more point cloud processing operations on point cloud data representing a three-dimensional point cloud.

In the description of the present embodiment, the three-dimensional point cloud is defined as a collection of, or a set of coordinate points in some directions, for example, the X, Y, and Z directions that correspond to measurement points on the surface of an object when a certain space in which the object is present is measured using, for example, a laser scanner LS. For example, the coordinate points are indicated as (1,3,5). Further, color information may be added to each of the coordinate points, and, as the color information, an RGB value may be added to each of the coordinate points. The three-dimensional point cloud may also be referred to as a point cloud. The point cloud data is data that represents a collection of, or a set of coordinate points, which correspond to a three-dimensional point cloud, in a virtual three-dimensional space, and that can be processed by, for example, a computer.

In the present embodiment, the three-dimensional point cloud is measured using the laser scanner LS. In some embodiments, another optical measurement unit or a mechanical measurement unit may be used. The optical measurement unit includes a method using a stereo camera and a method using Visual Simultaneous Localization and Mapping (SLAM).

Figure 2:
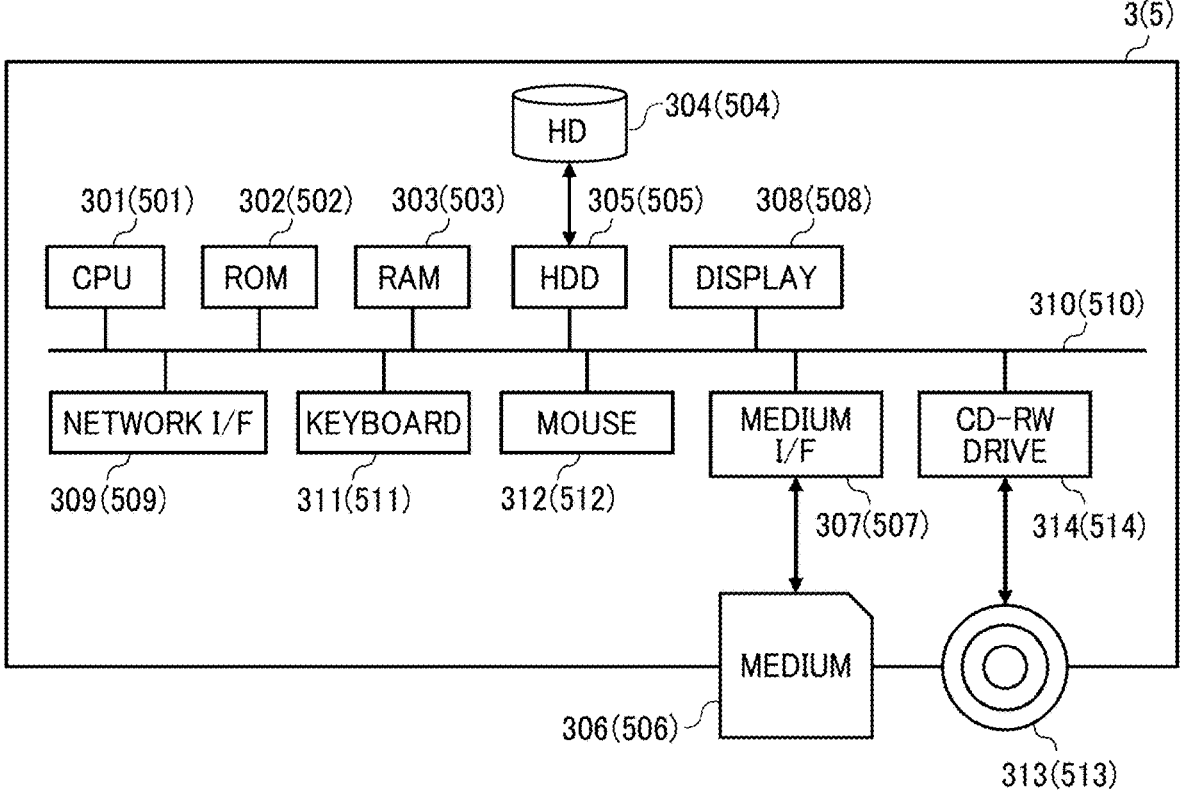
FIG. 2 is a block diagram illustrating a hardware configuration of each of a terminal apparatus and a management server according to an embodiment of the present disclosure.

The terminal apparatus 3 and the management server 5 can communicate with each other via a communication network 100. The communication network 100 is implemented by, for example, the Internet, a mobile communication network, or a local area network (LAN). The communication network 100 may include, in addition to wired communication networks, wireless communication networks in compliance with, for example, 3rd generation (3G), Worldwide Interoperability for Microwave Access (WiMAX), or long term evolution (LTE). Further, the terminal apparatus 3 can establish communication using a short-range communication technology such as NEAR FIELD COMMUNICATION (NFC) (registered trademark). Hardware Configuration FIG. 2 is a block diagram illustrating a hardware configuration of each of a terminal apparatus and a management server according to the present embodiment. Each of hardware components of the terminal apparatus 3 is denoted by a reference numeral in the 300 series. Each of hardware components of the management server 5 is denoted by a reference numeral in the 500 series.

The terminal apparatus 3 includes a central processing unit (CPU) 301, a read only memory (ROM) 302, a random access memory (RAM) 303, a hard disk (HD) 304, a hard disk drive (HDD) 305, a medium interface (I/F) 307 that controls reading and writing of various data from and to a recording medium 306, a display 308, a network I/F 309, a keyboard 311, a mouse 312, a compact disc-rewritable (CD-RW) drive 314, and a bus line 310.

The CPU 301 performs overall control of the operation of the terminal apparatus 3. The ROM 302 stores a program for driving the CPU 301. The RAM 303 is used as a work area for the CPU 301. The HD 304 stores various data such as a program. The HDD 305 controls reading and writing of various data to and from the HD 304 under the control of the CPU 301. The medium I/F 307 controls reading and writing of various data from and to the recording medium 306. The display 308 displays various information such as a cursor, a menu, a window, a character, or an image. The network I/F 309 is an interface for data communication via the communication network 100. The keyboard 311 is an input device that is provided with a plurality of keys that allows a user to input characters, numerals, or various instructions. The mouse 312 is another input device that allows a user to select or execute a specific instruction, select an object to be processed, or move a cursor being displayed. The CD-RW drive 314 controls reading and writing of various data from and to the CD-RW 313 that serves as a removable storage medium. In some embodiments, the terminal apparatus 3 has a configuration that controls reading and writing (storing) of data with respect to an external personal computer (PC) or an external device connected via a wired connection or wireless connection such as WIFI.

The management server 5 includes a CPU 501, a ROM 502, a RAM 503, an HD 504, an HDD 505, a medium I/F 507 that controls reading and writing of various data from and to a recording medium 506, a display 508, a network I/F 509, a keyboard 511, a mouse 512, a CD-RW drive 514, and a bus line 510. The above-described components of the management server 5 are substantially the same as or similar to the above-described components (the CPU 301, the ROM 302, the RAM 303, the HD 304, the HDD 305, the recording medium 306, the medium I/F 307, the display 308, the network I/F 309, the keyboard 311, the mouse 312, the CD-RW drive 314, and the bus line 310) of the terminal apparatus 3. Thus, the redundant description is omitted.

In some embodiments, a compact disc-recordable (CD-R) drive is used in alternative to the CD-RW drive 314 (514). Each of the terminal apparatus 3 and the management server may be implemented by a single computer or a plurality of computers to which divided units (functions, means, or storage units) are allocated as desired.

Figure 3:
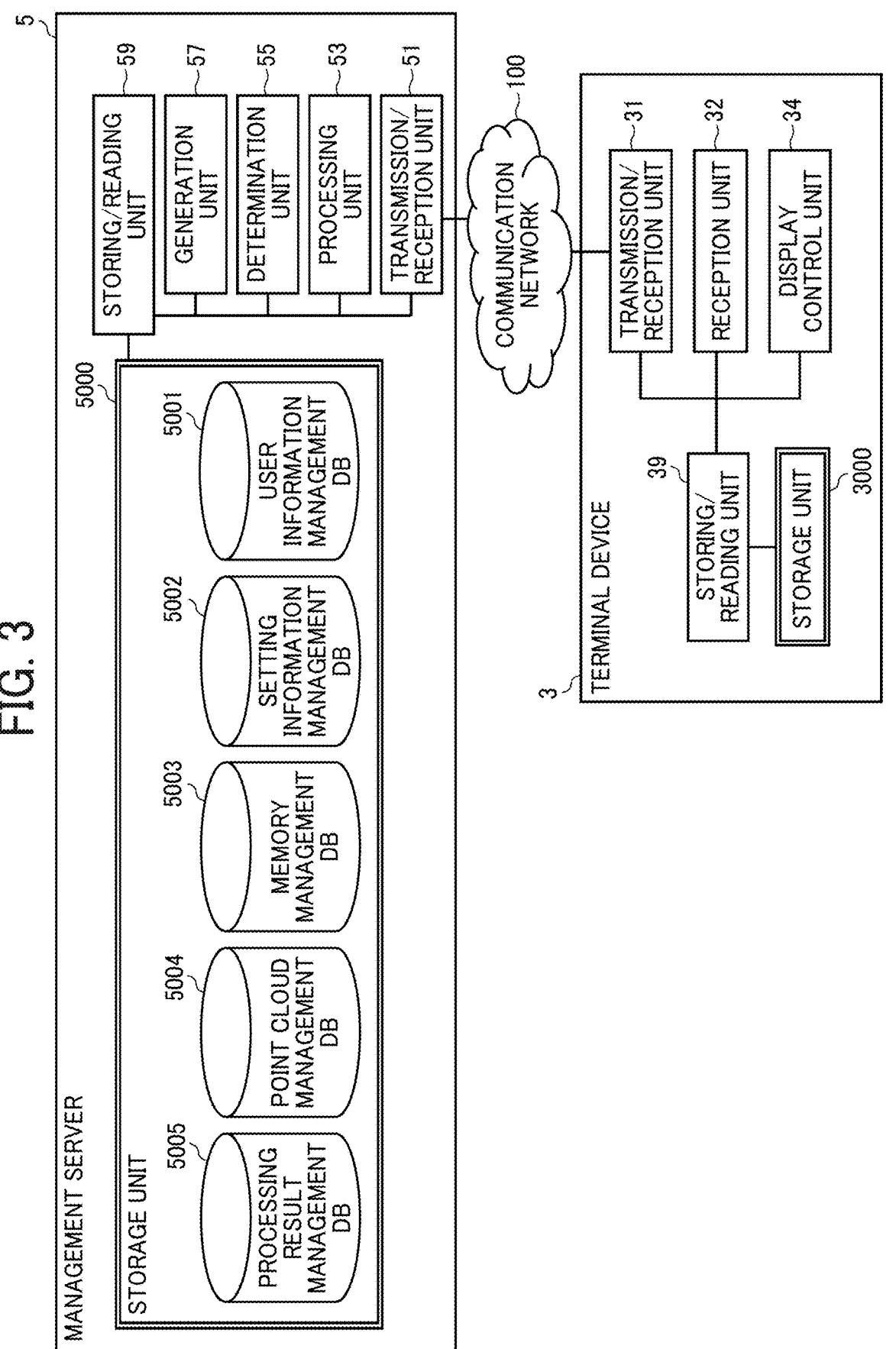
FIG. 3 is a block diagram illustrating a functional configuration of the point cloud processing system according to an embodiment of the present disclosure.

FIG. 3 is a block diagram illustrating a functional configuration of a point cloud processing system according to the present embodiment.

Functional Configuration of Terminal Apparatus

As illustrated in FIG. 3, the terminal apparatus 3 includes a transmission/reception unit 31, a reception unit 32, a display control unit 34, and a storing/reading unit 39. The units are functions or devices implemented by operating one or more of the components illustrated in FIG. 2 in response to an instruction from the CPU 301 operating according to a program loaded from the HD 304 to the RAM 303. The terminal apparatus 3 further includes a storage unit 3000 implemented by the RAM 303 and the HD 304 illustrated in FIG. 2.

Functional Units of Terminal Device

Each functional unit of the terminal apparatus 3 is described below.

The transmission/reception unit 31 serves as, for example, a receiving unit and is implemented by the network OF 309 illustrated in FIG. 2 in addition to an instruction from the CPU 301 illustrated in FIG. 2. The transmission/reception unit 31 transmits and receives various data (or information) to and from another terminal, device, apparatus, or system via the communication network 100.

The reception unit 32 serves as, for example, a receiving unit, and is implemented by the keyboard 311, and the mouse 312, which are illustrated in FIG. 2, in addition to an instruction from the CPU 301 illustrated in FIG. 2. The reception unit 32 receives various inputs from a user.

The display control unit 34 serves as, for example, a display control unit, and is implemented by an instruction from the CPU 301 illustrated in FIG. 2. The display control unit 34 controls the display 308 to display various images and screens.

The storing/reading unit 39 serves as, for example, a storage control unit, and is implemented by the HDD 305, the medium OF 307, the CD-RW drive 314, which are illustrated in FIG. 2, in addition to an instruction from the CPU 301 of FIG. 2. The storing/reading unit 39 stores various data in the storage unit 3000, the recording medium 306, or the CD-RW 313 and reads the various data from the storage unit 3000, the recording medium 306, or the CD-RW 313.

Functional Configuration of Management Server

The management server 5 includes a transmission/reception unit 51, a processing unit 53, a determination unit 55, a generation unit 57, and a storing/reading unit 59. Each of the above-mentioned units is a function that is implemented by or that is caused to function by operating one or more of the components illustrated in FIG. 2 according to an instruction from the CPU 501 according to a program loaded from the HD 504 to the RAM 503. The management server 5 further includes a storage unit 5000 implemented by the HD 504 illustrated in FIG. 2. The storage unit 5000 serves as a storing unit.

Functional Units of Management Server

Each functional unit of the management server 5 is described below. The management server 5 may be implemented by a plurality of computers in manner that some or all of the functions are distributed to the plurality of computers. In the following description of the present embodiment, the management server 5 is described as a server computer residing on a cloud environment. In some embodiments, the management server 50 is a server residing on an on-premises environment.

The transmission/reception unit 51 serves as, for example, a transmitting unit and is implemented by the network OF 509 illustrated in FIG. 2 in addition to an instruction from the CPU 501 illustrated in FIG. 2. The transmission/reception unit 51 transmits and receives various data (or information) to and from another terminal, device, apparatus, or system via the communication network 100.

The processing unit 53 is implemented by an instruction from the CPU 501 illustrated in FIG. 2 and performs various processes, which are described later. The processing unit 53 serves as, for example, a point cloud processing unit.

The determination unit 55 is implemented by an instruction from the CPU 501 illustrated in FIG. 2 and performs various determinations, which are described later.

The generation unit 57 is implemented by an instruction from the CPU 501 illustrated in FIG. 2 and performs various types of generation such as screen generation, which is described later.

The storing/reading unit 59 serves as, for example, a storage control unit, and is implemented by the HDD 505, the medium OF 507, and the CD-RW drive 514, which are illustrated in FIG. 2, in addition to an instruction from the CPU 501 illustrated in FIG. 2. The storing/reading unit 59 stores various data in the storage unit 5000, the recording medium 506, or the CD-RW 513 and reads the various data from the storage unit 5000, the recording medium 506, or the CD-RW 513. Each of the storage unit 5000, the recording medium 506, the CD-RW 513, the external PC, and the external device serves as a storing unit.

In the storage unit 5000 includes a user information management database (DB) 5001, a setting information management DB 5002, a memory management DB 5003, a point cloud management DB 5004, and a processing result management DB 5005 that are implemented by a setting information management table.

In the user information management DB 5001, a file name of three-dimensional point cloud data is stored and managed in association with user information. In the setting information management DB 5002 various setting information is stored and managed. In the memory management DB 5003, various processing programs for performing point cloud processing are stored and managed. In the point cloud management DB 5004, point cloud data is stored and managed. In the processing result management DB 5005, processing result information indicating a processing result of point cloud processing performed on point cloud data is stored and managed.

FIG. 4 is a conceptual diagram illustrating a setting information management table according to the present embodiment.

The setting information management table is a table for managing three-dimensional point cloud data for generating point cloud processing and a history of processes that generates the point cloud processing. In the storage unit 5000, the setting information management DB 5002 including the setting information management table as illustrated in FIG. 4 is implemented. In the setting information management table, a plurality of quality types is associated with each processing result type and managed. Further, for each of the plurality of quality types in the setting information management table, one or more point cloud processing operations to be executed and one or more qualities of the one or more point cloud processing operations are associated with the order of the one or more point cloud processing operations.

The processing result type includes at least two of a merged point cloud, a mesh object, a textured mesh object, and a three-dimensional CAD model.

The point cloud processing includes at least one of registration processing for merging point clouds captured at two or more locations, noise removal processing for removing a point cloud determined as noise, mesh generation processing for forming a surface from a point cloud, texture mapping processing for applying RGB values to a mesh object, segmentation processing for identifying a point cloud, point cloud reduction processing for reducing point cloud density, and three-dimensional CAD model conversion (fitting) processing for converting a point cloud into a three-dimensional CAD model. Each of the registration processing, the noise removal processing, the mesh generation processing, the texture mapping processing, the segmentation processing, the point cloud reduction processing, and the three-dimensional CAD model conversion (fitting) processing that may be included in the point cloud processing may be referred to as a point cloud processing operation, in the description of the present embodiment.

As illustrated in FIG. 4, in the case of the processing result type "MERGED POINT CLOUD" and the quality 1, the registration processing is executed at the processing order 1, and the noise removal processing with the quality "REMOVAL RATE: HIGH" is executed at the processing order 2.

Further, in the case of the processing result type "MERGED POINT CLOUD" and the quality 2, the registration processing is executed at the processing order 1, and the noise removal processing with the quality "REMOVAL RATE: MEDIUM" is executed at the processing order 2.

Further, in the case of the processing result type "MERGED POINT CLOUD" and the quality 3, the registration processing is executed at the processing order 1, and the noise removal processing with the quality "REMOVAL RATE: LOW" is executed at the processing order 2.

In the case of the processing result type "MESH, TEXTURE" and the quality 1, the registration processing is executed at the processing order 1, the noise removal processing with quality "REMOVAL RATE: HIGH" is executed at the processing order 2, the mesh generation processing with the quality "HOLE DENSITY: HIGH" and "FLATNESS LEVEL: MEDIUM" is executed at the processing order 3, and the texture mapping processing with the quality "SEAM SURFACE DISCREPANCY: LOW" is executed at the processing order 4.

Further, in the case of the processing result type "MESH, TEXTURE" and the quality 2, the registration processing is executed at the processing order 1, the noise removal processing with quality "REMOVAL RATE: MEDIUM" is executed at the processing order 2, the mesh generation processing with the quality "HOLE DENSITY: MEDIUM" and "FLATNESS LEVEL: LOW" is executed at the processing order 3, and the texture mapping processing with the quality "SEAM SURFACE DISCREPANCY: HIGH" is executed at the processing order 4.

Further, in the case of the processing result type "MESH, TEXTURE" and the quality 3, the registration processing is executed at the processing order 1, the noise removal processing with quality "REMOVAL RATE: LOW" is executed at the processing order 2, the mesh generation processing with the quality "HOLE DENSITY: LOW" and "FLATNESS LEVEL: HIGH" is executed at the processing order 3, and the texture mapping processing with the quality "SEAM SURFACE DISCREPANCY: MEDIUM" is executed at the processing order 4.

In the case of the processing result type "3D MODEL" and the quality 1, the registration processing is executed at the processing order 1, the noise removal processing with the quality "REMOVAL RATE: HIGH" is executed at the processing order 2, the segmentation processing is executed at the processing order 3, and the model fitting processing with the quality "MODEL GENERATION VOLUME: HIGH" is executed at the processing order 4.

Further, in the case of the processing result type "3D MODEL" and the quality 2, the registration processing is executed at the processing order 1, the noise removal processing with the quality "REMOVAL RATE: MEDIUM" is executed at the processing order 2, the segmentation processing is executed at the processing order 3, and the model fitting processing with the quality "MODEL GENERATION VOLUME: MEDIUM" is executed at the processing order 4.

Further, in the case of the processing result type "3D MODEL" and the quality 3, the registration processing is executed at the processing order 1, the noise removal processing with the quality "REMOVAL RATE: LOW" is executed at the processing order 2, the segmentation processing is executed at the processing order 3, and the model fitting processing with the quality "MODEL GENERATION VOLUME: LOW" is executed at the processing order 4.

In the above description, the setting information management table includes a plurality of processing types including processing types that differ from each other in the terms of the number of point cloud processing operations to be executed, a combination of point cloud processing operations to be executed, or the processing order of point cloud processing operations.

Further, the qualities such as "REMOVAL RATE" in the noise removal processing, "HOLE DENSITY" and "FLATNESS LEVEL" in the mesh generation processing, "SEAM SURFACE DISCREPANCY" in the texture mapping processing, or "MODEL GENERATION VOLUME" in the model fitting processing can be changed by changing parameters when a corresponding processing operation of point cloud processing such as noise removal processing is executed. Accordingly, the degree of the point cloud processing can vary.

For example, in processing, a point cloud is subjected to line segment approximation using a least square method or a similar method, and points are, or a point cloud is, removed depending on the degree of distance, or separation, from the approximate line segment. In this processing, the parameter is numerical value information indicating a numerical value for controlling the degree of separation. The smaller the numerical value is set to be, the more likely the point cloud is to be removed, and the point cloud can be easily removed with even a slight amount of separation from the approximate line segment. On the other hand, the larger the numerical value is set to be, the less likely a point cloud is to be removed, and the point cloud is not removed as long as the point cloud is within the parameter even if the point cloud has some amount of separation from the approximate line segment.

Further, at least one of the plurality of quality types indicates a combination of qualities of two or more of the plurality of point cloud processing operations.

For example, in the case of the noise removal processing performed with the quality "REMOVAL RATE: HIGH," a normal point cloud is also removed, and the quality of the model fitting processing may be degraded. As a result, the quality of the final processing result may not be desirable.

In other words, in the present embodiment, the quality of each point cloud processing operation used for obtaining the quality of the processing result is defined, and this can prevent the quality of the processing result from being degraded even if the quality of each point cloud processing operation is satisfied.

Further, by providing an option for selecting the quality of the processing result, even an unskilled user can easily set the quality as compared with a case where an option for selecting the quality of each point cloud processing operation is provided.

Figure 5B:
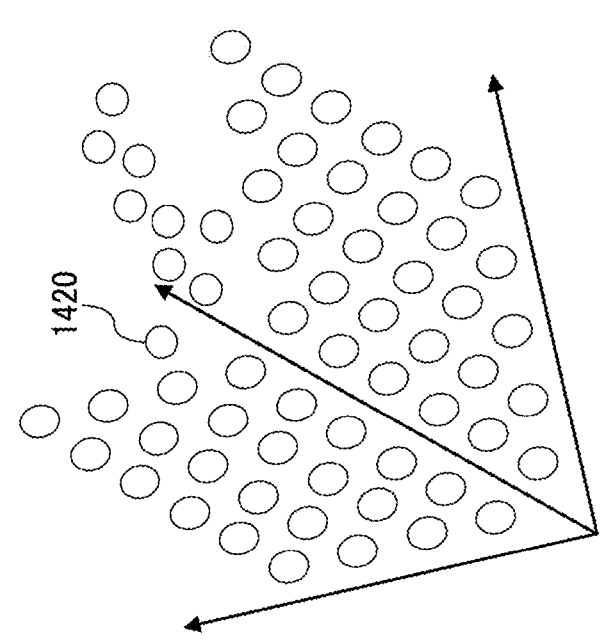
FIGS. 5A and 5B are diagrams illustrating registration processing according to an embodiment of the present disclosure.
Figure 5A:
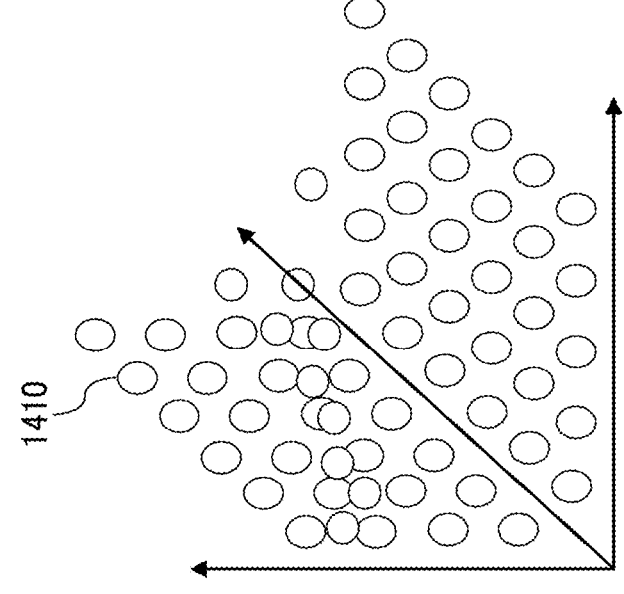

FIGS. 5A and 5B are diagrams illustrating registration processing according to the present embodiment. The registration processing is processing for transforming a plurality of three-dimensional point clouds into a unified and integrated three-dimensional point cloud.

FIG. 5A is a diagram illustrating a first three-dimensional point cloud 1410, according to the present embodiment. FIG. 5B is a diagram illustrating a second three-dimensional point cloud 1420, according to the present embodiment.

The processing unit 53 moves (translates) or rotates, for example, the entire second three-dimensional point cloud 1420 with respect to the first three-dimensional point cloud 1410 so that the relative positional relationship between the points included in each of the first three-dimensional point cloud 1410 and the second three-dimensional point cloud 1420 does not change.

Then, when a value of a distance function indicating a distance between the first three-dimensional point cloud 1410 and the second three-dimensional point cloud 1420 is less than a threshold value, the processing unit 53 ends the processing.

In the registration processing described above, threshold values for translation, rotation, and distance function of the second three-dimensional point cloud 1420 with respect to the first three-dimensional point cloud 1410 are controlled by parameters, and the quality of alignment in the registration processing can be changed by changing the parameters, accordingly.

Figure 6:
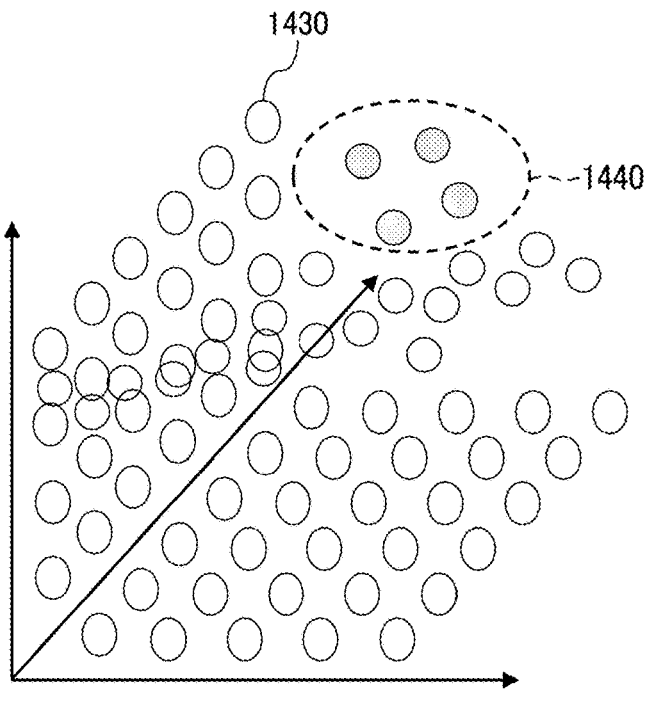
FIG. 6 is a diagram illustrating noise removal processing according to an embodiment of the present disclosure.

FIG. 6 is a diagram illustrating noise removal processing according to the present embodiment.

For example, the processing unit 53 creates an approximate curve based on points included in a three-dimensional point cloud 1430, and removes points with distances equal to or greater than the threshold value from the approximate curve as unnecessary points 1440.

In the noise removal processing described above, the approximate curve and the threshold value for the distance from the approximate curve are controlled by parameters, and the quality of the noise removal processing can be changed by changing the parameters, accordingly.

Figure 7:
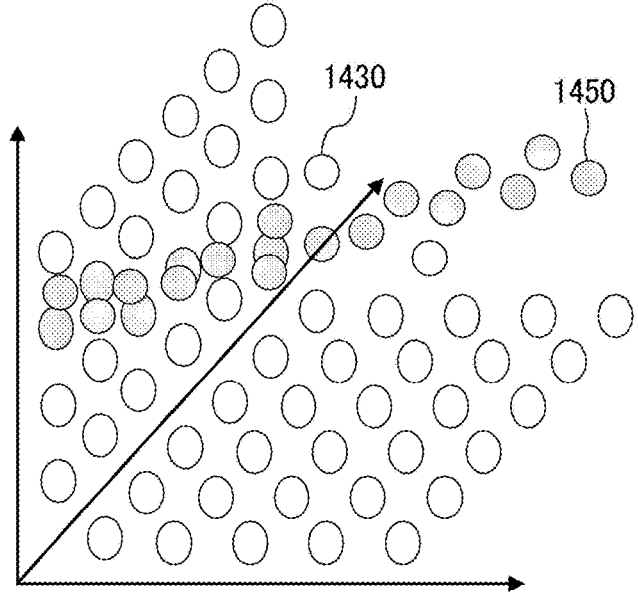
FIG. 7 is a diagram illustrating segmentation processing according to an embodiment of the present disclosure.

FIG. 7 is a diagram illustrating segmentation processing according to the present embodiment.

The segmentation processing is a process of labeling specific points (a specific point cloud) in a three-dimensional point cloud so that the specific points (the specific point cloud) can be distinguished from the other points. Different labels may be assigned to the specific points, so that the points can be mutually distinguishable from one another. The segmentation processing may be performed along with clustering processing that groups points being close in proximity in the labeled points (labeled point cloud).

The processing unit 53 labels specific points (a specific point cloud) in the three-dimensional point cloud 1430 to form a labeled point cloud 1450 (black points), and the points of labeled point cloud 1450 are distinguishable from the other points, accordingly.

For example, the processing unit 53 calculates a score indicating a probability of being a part of a pipe for each point in the three-dimensional point cloud 1430 and labels a point having a score equal to or greater than a threshold value.

In the segmentation processing including the clustering processing described above, since the threshold value for the score is controlled by parameters, the quality of the point cloud identification in the segmentation processing can be changed by changing the parameters.

Figure 8B:
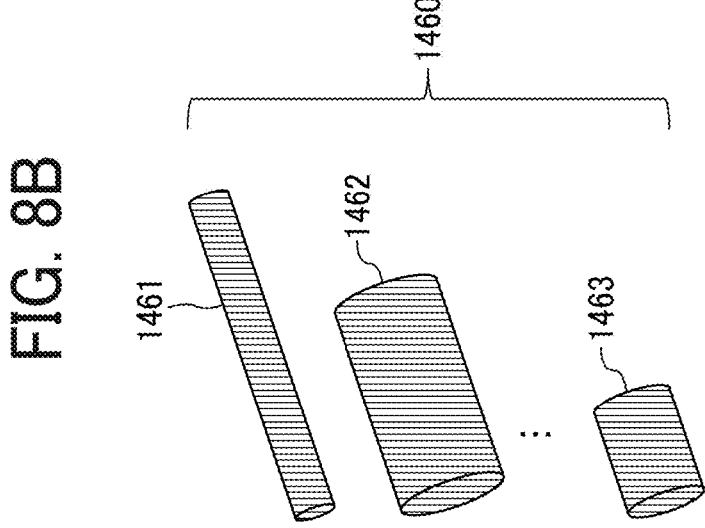
FIGS. 8A and 8B are diagrams illustrating a model transformation process according to an embodiment of the present disclosure.
Figure 8A:
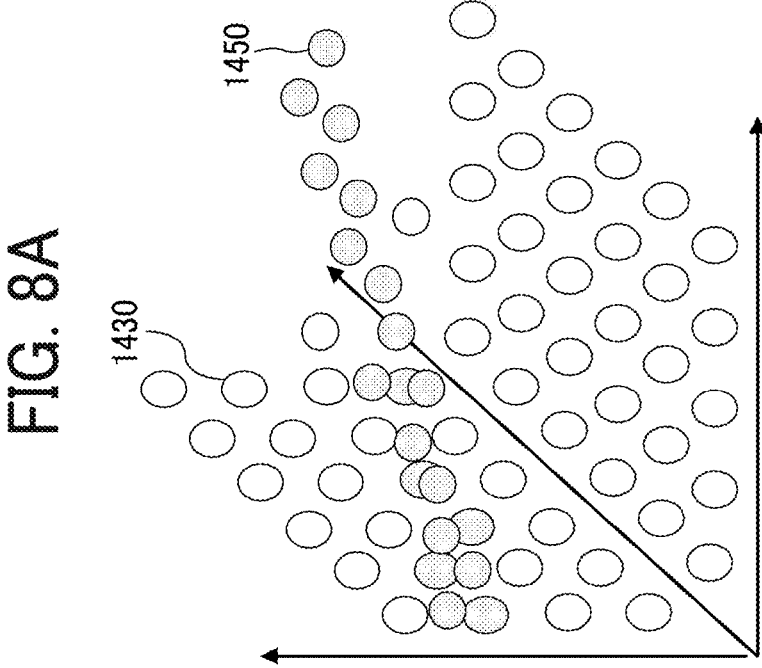

FIGS. 8A and 8B are diagrams illustrating a model transformation process according to the present embodiment.

FIG. 8A is a diagram illustrating the three-dimensional point cloud 1430, according to the present embodiment. FIG. 8B is a diagram illustrating candidate pipe models 1460, according to the present embodiment.

The candidate pipe models 1460 include a plurality of model shapes 1461, 1462, and 1463 having different shapes.

The processing unit 53 collates the labeled point cloud 1450 (black points) with each of the plurality of model shapes 1461, 1462, and 1463 of the pipe, and replaces the specific region using the model shape having the closest shape. When there is no optimum model shape among the plurality of model shapes 1461, 1462, and 1463, the processing unit 53 may adjust the size and shape of the model shape.

In the description of the present embodiment, for example, the distance between the model shape and each point of the point cloud is calculated, and the model shape having the smallest sum of the distances is determined as the model shape having the closest shape.

For example, when the distance between the model shape and each point of the point cloud is equal to or less than a threshold value, the processing unit 53 performs model fitting for replacing the specific region using the model shape.

In the model transformation process described above, since the threshold value for the distance between the model shape and each point of the point cloud is controlled by parameters, the quality of the model generation amount in the model transformation process can be changed by changing the parameters.

Figure 9:
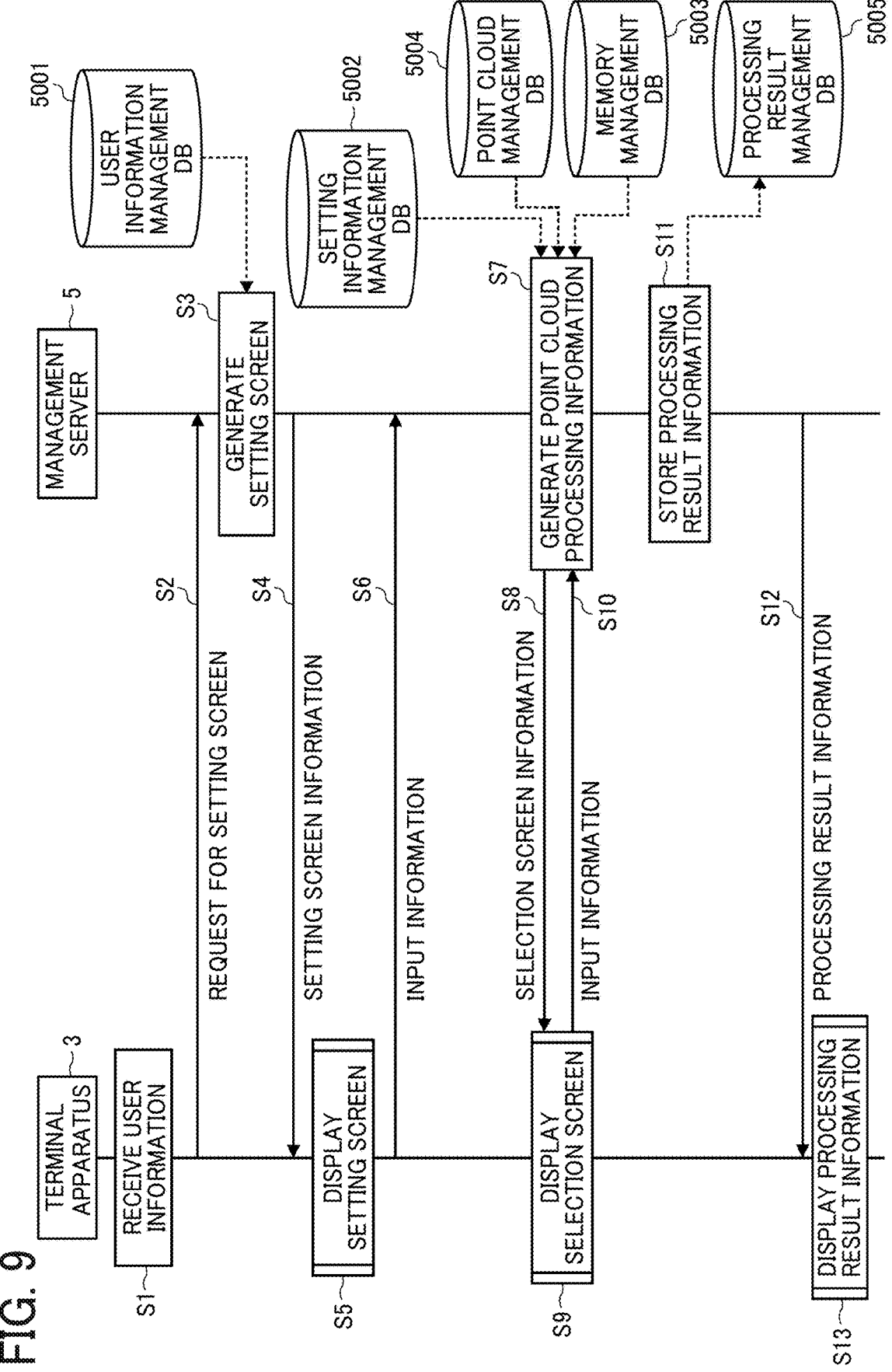
FIG. 9 is a sequence diagram illustrating point cloud processing according to an embodiment of the present disclosure.

FIG. 9 is a sequence diagram illustrating point cloud processing according to the present embodiment.

The reception unit 32 of the terminal apparatus 3 receives an input operation related to user information (Step S1). The transmission/reception unit 31 of the terminal apparatus 3 transmits to the management server 5 a request for a setting screen along with the user information received in Step S1, and the transmission/reception unit 51 of the management server 5 receives the request transmitted from the terminal apparatus 3 (Step S2). In the description of the present embodiment, the request transmitted along with the user information means that the request includes the user information.

Subsequently, the storing/reading unit 59 of the management server 5 searches the user information management DB 5001 using the user information included in the request received in Step S2 as a search key to read a file name of three-dimensional point cloud data associated with the user information included in the request, and the generation unit 57 of the management server 5 generates a display screen including a setting screen based on the file name read by the storing/reading unit 59 (Step S3).

The setting screen displays, as options, a plurality of pieces of processing result type information indicating a plurality of processing result types each of which is a result of a corresponding one of the plurality of processing types.

The transmission/reception unit 51 transmits to the terminal apparatus 3 display screen information including setting screen information related to the setting screen generated in Step S3, and the transmission/reception unit 31 of the terminal apparatus 3 receives the display screen information transmitted from the management server 5 (Step S4).

Subsequently, the display control unit 34 of the terminal apparatus 3 displays on the display 308 the display screen including the setting screen received in Step S4 (Step S5). The reception unit 32 of the terminal apparatus 3 receives an input operation performed by a user on the setting screen currently displayed. The input operation includes a setting operation for setting one piece of processing result type information from among the plurality of pieces of processing result type information.

The transmission/reception unit 31 transmits input information related to the input operation received by the reception unit 32 to the management server 5, and the transmission/reception unit 51 of the management server 5 receives the input information transmitted from the terminal apparatus 3 (Step S6). The input information includes processing setting information for setting the piece of processing result type information from among the plurality of processing result type information.

The storing/reading unit 59 of the management server 5 searches the point cloud management DB 5004 using point cloud setting information included in the input information received in Step S6 as a search key to read three-dimensional point cloud data associated with the point cloud setting information.

The storing/reading unit 59 further searches the setting information management DB 5002 using the processing setting information included in the input information received in Step S6 as a search key to read the plurality of quality types associated with the processing setting information, and read one or more point cloud processing operation names, one or more quality of the one or more point cloud processing operations, and processing order of the one or more point cloud processing operations for each of the plurality of quality types.

The storing/reading unit 59 further searches the memory management DB 5003 using the point cloud processing operation name read from the setting information management DB 5002 as a search key to read a point cloud processing program associated with the point cloud processing name.

The processing unit 53 of the management server 5 generates point cloud processing information based on the three-dimensional point cloud data, the point cloud processing program, the quality type, the quality of the point cloud processing operation, and the order of the point cloud processing operations read by the storing/reading unit 59 (Step S7). The point cloud processing information includes a plurality of processing results each of which is obtained by performing the point cloud processing corresponding to one of the plurality of quality types.

Step S7 serves as a point cloud processing step of executing one or more of the point cloud processing operations on the point cloud data representing a three-dimensional point cloud.

The generation unit 57 of the management server 5 generates a display screen including a selection screen displaying, as options, a plurality of pieces of quality information indicating the plurality of qualities of the point cloud processing, and the transmission/reception unit 51 transmits display screen information including selection screen information indicating the selection screen to the terminal apparatus 3 (Step S8). Step S8 serves as a generation step.

The transmission/reception unit 31 of the terminal apparatus 3 receives the display screen information including the selection screen information transmitted from the management server 5, the display control unit 34 of the terminal apparatus 3 displays on the display 308 the display screen including the received selection screen, and the reception unit 32 of the terminal apparatus 3 receives an input operation performed by the user on the selection screen currently displayed (Step S9).

The input operation includes a selection operation of selecting a piece of quality information from among the plurality of pieces of quality information and an adjustment operation of adjusting a processing result of the point cloud processing. In some embodiments, the selection operation is an operation of selecting two or more desired pieces of quality information from the plurality of pieces of quality information.

The transmission/reception unit 31 transmits input information related to the input operation received by the reception unit 32 to the management server 5, and the transmission/reception unit 51 of the management server 5 receives the input information transmitted from the terminal apparatus 3 (Step S10).

When the input information includes selection information obtained according to the selection operation, the processing unit 53 of the management server 5 determines the processing result based on the selection information.

By contrast, when the input information includes adjustment information obtained according to the adjustment operation, the processing unit 53 of the management server 5 performs the point cloud processing in Step S7 again based on the adjustment information.

The processing unit 53 converts the processing result information into, for example, a file format readable by the point cloud processing software, a file format readable by the 3DCAD software, or a file format readable by the BIM/CIM software, and the storing/reading unit 59 stores the converted processing result information in the processing result management DB 5005, the recording medium 506, or the CD-RW 513 (Step S11). Step S11 serves as a storing step.

The transmission/reception unit 51 transmits the determined processing result information to the terminal apparatus 3 (Step S12).

The transmission/reception unit 31 of the terminal apparatus 3 receives the processing result information transmitted from the management server 5, and the display control unit 34 of the terminal apparatus 3 displays the received processing result on the display 308 (Step S13).

In some embodiments, the functional units of the management server 5 in FIG. 3 are integrated into the terminal apparatus 3, and the processing of the management server 5 described with reference to FIG. 9 is also executed by the terminal apparatus 3.

Figure 10:
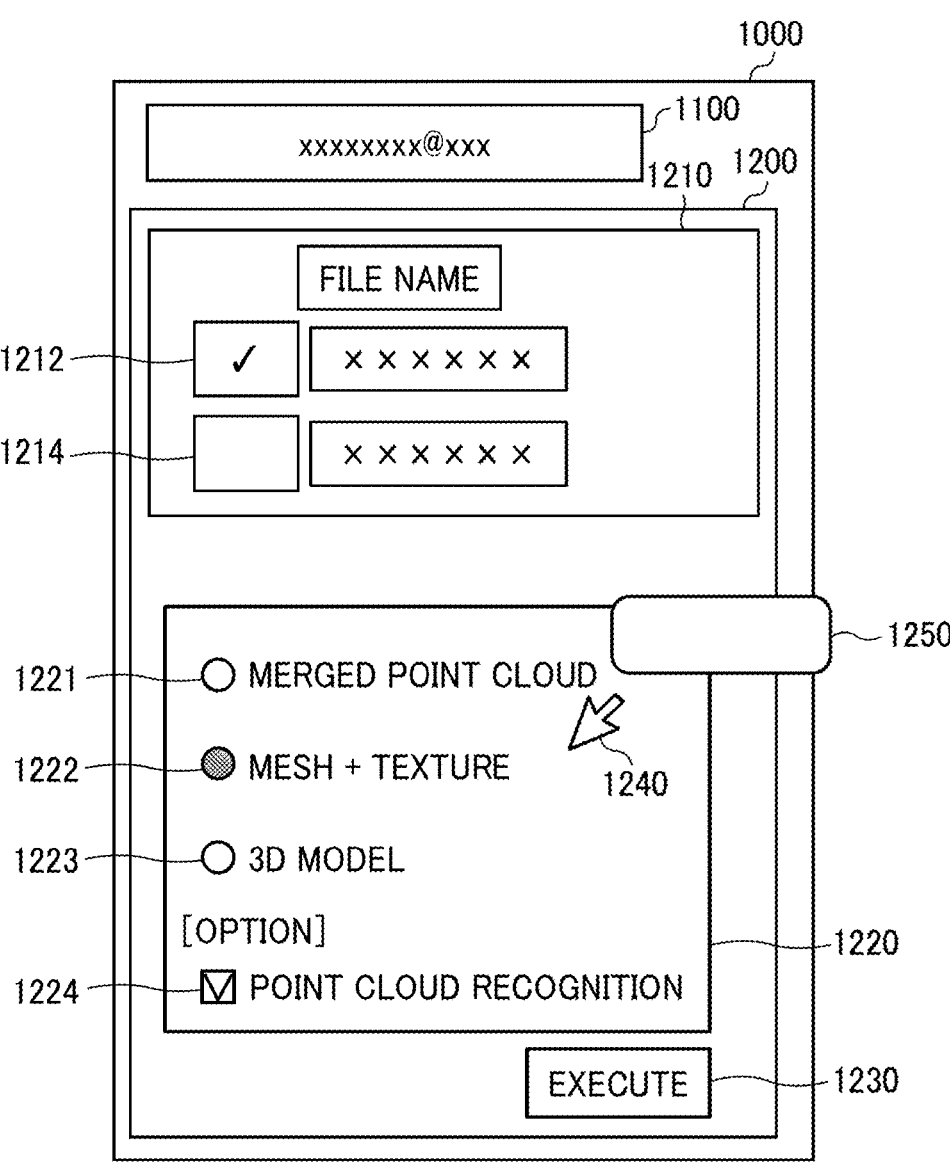
FIG. 10 is a diagram illustrating a setting screen according to an embodiment of the present disclosure.

FIG. 10 is a diagram illustrating a setting screen according to the present embodiment. In FIG. 10, a display screen 1000 that is displayed on the display 308 of the terminal apparatus 3 in Step S5 of the sequence diagram of FIG. 9 is illustrated.

The display control unit 34 of the terminal apparatus 3 displays a user information display screen 1100 and a setting screen 1200 on the display screen 1000.

The setting screen 1200 includes a point cloud setting screen 1210, a processing setting screen 1220, and an execution button 1230.

The point cloud setting screen 1210 is a screen for receiving a point cloud setting operation for setting point cloud data representing a three-dimensional point cloud to be used for execution of the point cloud processing, and the display control unit 34 displays point cloud setting boxes 1212 and 1214 each of which is associated with a file name of one of multiple point cloud data files read by the storing/reading unit 59. More than one point cloud setting boxes (point cloud setting boxes 1212 and 1214) can be set.

The processing setting screen 1220 is a screen for receiving a setting operation for setting a processing result type to be obtained by performing the point cloud processing. The display control unit 34 displays processing setting boxes 1221, 1222, and 1223 each of which is associated with a name of one of the plurality of processing result types, and displays an option setting box 1224 common to the plurality of processing result types. The display control unit 34 further displays the execution button 1230 for confirming various setting operations.

The display control unit 34 further displays the pointer 1240 corresponding to, for example, the mouse 312 for selecting one of the processing setting boxes 1221 to 1223 or the option setting box 1224. When the pointer 1240 is brought close to one of the processing setting boxes 1221 to 1223, the display control unit 34 further displays a piece of processing result type information 1250.

In other words, the processing setting screen 1220 displays, as options, a plurality of pieces of processing result type information 1250 indicating the types of processing results corresponding to the plurality of processing types.

In the description of the present embodiment, as described with reference to FIG. 4, the plurality of processing types that differ from each other in the terms of the number of point cloud processing operations to be executed, a combination of point cloud processing operations to be executed, or the processing order of point cloud processing operations.

In FIG. 10, the processing setting box 1221 is for setting a processing result type related to the merged point cloud, the processing setting box 1222 is for setting a processing result type related to the mesh+texture, and the processing setting box 1223 is for setting a processing result type related to the 3D model. Further, the option setting box 1224 is common to the plurality of processing result types and is used to set whether to execute processing related to segmentation.

When one of the setting boxes is pointed by the pointer 1240, the display control unit 34 of the terminal apparatus 3 displays a black circle or a check mark in the pointed one of the setting boxes as illustrated in FIG. 10, and in response to the reception unit 32 of the terminal apparatus 3 receiving an operation performed on the execution button 1230 after receiving the setting operations, the various setting operations are confirmed.

Then, as described above with respect to Step S6 of FIG. 9, the transmission/reception unit 31 transmits to the management server 5 the input information including various setting information obtained according to the various setting operations received by the reception unit 32.

FIGS. 11A and 11B are diagrams illustrating a selection screen and an adjustment screen, respectively, according to the present embodiment. The screens illustrated in FIGS. 11A and 11B are displayed in the case where the processing result type related to the mesh+texture is selected on the screen in FIG. 10. In the case where the processing result type related to the merged point cloud or the processing result type related to the 3D model is selected on the screen illustrated in FIG. 10, the corresponding screens are to be displayed in a manner substantially the same as or similar to the screens illustrated in FIGS. 11A and 11B.

In FIG. 11A, a display screen 1000-1 that is displayed on the display 308 of the terminal apparatus 3 in Step S9 of the sequence diagram illustrated in FIG. 9 is illustrated. The display control unit 34 of the terminal apparatus 3 displays a selection screen 1300 on the display screen 1000-1.

The selection screen 1300 is a screen for receiving an operation of selecting a quality of the point cloud processing, and the display control unit 34 displays selection boxes 1321, 1322, and 1323 in association with qualities 1, 2, and 3, respectively. Each of the qualities 1 to 3 indicates a name of one of the plurality of qualities. The selection screen 1300 also displays a determination button 1330 for determining various selection operations. Further, the display control unit 34 displays a parameter adjustment button 1360 for adjusting the processing result of the point cloud processing.

Further, the display control unit 34 displays a pointer 1340 corresponding to, for example, the mouse 312 for selecting one of the selection boxes 1321 to 1323. When the pointer 1340 is brought close to one of the selection boxes 1321 to 1323, the display control unit 34 further displays corresponding quality information indicated by a piece of quality information 1350. The piece of quality information 1350 indicates the quality of corresponding one of the selection boxes 1321 to 1323.

The selection boxes 1321 to 1323 serve as options, and are used to select one quality from the plurality of qualities corresponding to the qualities 1 to 3. More preferably, the piece of quality information 1350 is one of a plurality of pieces of quality information 1350 corresponding to the qualities 1 to 3, and one of the plurality of pieces of quality information 1350 is selected.

In other words, the selection screen 1300 displays, as options, the plurality of pieces of quality information 1350 indicating the qualities of the point cloud processing. Accordingly, the user can determine which processing result has the desired quality by checking the plurality of pieces of quality information 1350 corresponding to the selection boxes 1321 to 1323.

The piece of quality information 1350 is displayed outside the selection boxes 1321 to 1323 in FIG. 11A. Alternatively, the piece of quality information 1350 may be displayed in the corresponding one of the selection boxes 1321 to 1323 when the selection screen 1300 has enough space and a suitable layout. In some embodiments, the plurality of pieces of quality information 1350 is described in a separately prepared manual or an electronic manual displayed on a screen that is different from the selection screen 1300.

For example, as illustrated in FIG. 11A, when the selection box 1322 is pointed by the pointer 1340, the display control unit 34 changes the color of the selection box 1322, which is the pointed one, and the reception unit 32 receives a selection operation performed on the selection box 1322 and further accepts the selection operation as a confirmed operation in response to receiving an operation performed on the determination button 1330. The same applies to a case where any one of the selection boxes 1321 to 1323 other than the selection box 1322 is pointed by the pointer 1340 and selected.

Then, as described in Step S10 of FIG. 9, the transmission/reception unit 31 transmits the input information including the selection information according to the selection operation received by the reception unit 32 to the management server 5.

Alternatively, when the reception unit 32 receives the selection operation on the selection box 1322 and then receives an operation on the parameter adjustment button 1360, the display control unit 34 switches the screen to the display screen 1000-2 illustrated in FIG. 11B.

In FIG. 11B, the display control unit 34 displays an adjustment screen 1500 on the display screen 1000-2. In FIG. 11B, the adjustment screen 1500 related to the quality 2 is illustrated on the assumption that the selection box 1322 corresponding to the quality 2 is selected on the screen illustrated in FIG. 11A.

The adjustment screen 1500 is a screen for receiving an adjustment operation for adjusting the processing result of the point cloud processing. The display control unit 34 displays on the adjustment screen 1500 adjustment bars 1521, 1522, and 1523 each of which is associated with a name of a plurality of parameters, and displays a completion button 1530 for completing the adjustment operation using the adjustment bars.

The adjustment operation is not limited to adjusting a value by using an adjustment bar for a continuous value, but may be adjusting a value by using discrete values such as high, medium, and low. The adjustment operation may include a plurality of variations such as the ones described above.

The adjustment bar 1521 is used to adjust a parameter corresponding to the quality of the "REMOVAL RATE" in the noise removal processing. The adjustment bar 1522 is used to adjust a parameter corresponding to the quality of the "HOLE DENSITY" in the mesh generation processing. The adjustment bar 1523 is used to adjust a parameter corresponding to the quality of "FLATNESS LEVEL" in the mesh generation processing.

When the reception unit 32 receives the operation on the completion button 1530 after receiving the adjustment operation on one or more of the adjustment bars 1521 to 1523, the transmission/reception unit 31 transmits the input information including the adjustment information according to the adjustment operation received by the reception unit 32 to the management server 5, as described in Step S10 of FIG. 9, and the display control unit 34 displays the display screen 1000-1 illustrated in FIG. 11A again.

FIG. 12 is a diagram illustrating the processing result type information and the quality information according to the present embodiment.

For the processing setting box 1221 for setting the processing result type related to the merged point cloud, the piece of processing result type information 1250 is displayed as "POINT CLOUD REPRESENTATION GENERATED BY ALIGNING POINT CLOUDS CAPTURED AT A PLURALITY OF LOCATIONS."

With respect to the processing setting box 1222 for setting the processing result type related to the mesh+texture, the piece of processing result type information 1250 is displayed as "REPRESENTATION BY APPLYING SURFACE (MESH) TO THE MERGED POINT CLOUD AND OVERLAYING IMAGES ON SURFACE."

With respect to the processing setting box 1223 for setting the processing result type related to the 3D model, the processing result type information 1250 is displayed as "REPRESENTATION BY REPLACING POINT CLOUD WITH BASIC GEOMETRIC SHAPE (GEOMETRIC MODEL) SUCH AS CYLINDER OR CUBOID."

With respect to a selection box for selecting the quality 1 related to the merged point cloud, the quality information is displayed as "NOISE REMOVAL RATE: HIGH."

With respect to a selection box for selecting the quality 2 related to the merged point cloud, the quality information is displayed as "NOISE REMOVAL RATE: MEDIUM."

With respect to a selection box for selecting the quality 3 related to the merged point cloud, the quality information is displayed as "NOISE REMOVAL RATE: LOW."

With respect to the selection box 1321 for selecting the quality 1 related to the mesh+texture, the piece of quality information 1350 is displayed as "(NOISE REMOVAL RATE: HIGH) HOLE DENSITY: HIGH, FLATNESS LEVEL: MEDIUM, SEAM SURFACE DISCREPANCY: LOW." The content enclosed in parentheses may not be displayed.

With respect to the selection box 1322 for selecting the quality 2 related to the mesh+texture, the piece of quality information 1350 is displayed as "(NOISE REMOVAL RATE: MEDIUM) HOLE DENSITY: MEDIUM, FLATNESS LEVEL: LOW, SEAM SURFACE DISCREPANCY: HIGH." The content enclosed in parentheses may not be displayed.

With respect to the selection box 1323 for selecting the quality 3 related to the mesh+texture, the piece of quality information 1350 is displayed as "(NOISE REMOVAL RATE: LOW) HOLE DENSITY: LOW, FLATNESS LEVEL: HIGH, SEAM SURFACE DISCREPANCY: MEDIUM." The content enclosed in parentheses may not be displayed.

With respect to a selection box for selecting the quality 1 related to the 3D model, the quality information is displayed as "(NOISE REMOVAL RATE: HIGH) MODEL GENERATION VOLUME: HIGH." The content enclosed in parentheses may not be displayed.

With respect to a selection box for selecting the quality 2 related to the 3D model, the quality information is displayed as "(NOISE REMOVAL RATE: MEDIUM) MODEL GENERATION VOLUME: MEDIUM." The content enclosed in parentheses may not be displayed.

With respect to a selection box for selecting the quality 3 related to the 3D model, the quality information is displayed as "(NOISE REMOVAL RATE: LOW) MODEL GENERATION VOLUME: LOW." The content enclosed in parentheses may not be displayed.

In the above description, at least one piece of quality information among the plurality of pieces of quality information indicates a combination of qualities of two or more of the plurality of point cloud processing operations.

Further, as described with reference to FIG. 4, each of the plurality of processing result types includes the plurality of processing types that differ from each other in the terms of the number of point cloud processing operations to be executed, a combination of point cloud processing operations to be executed, or the processing order of point cloud processing operations, and the quality information varies according to each of the plurality of processing types of a corresponding one of the plurality of processing result types.

Figure 13:
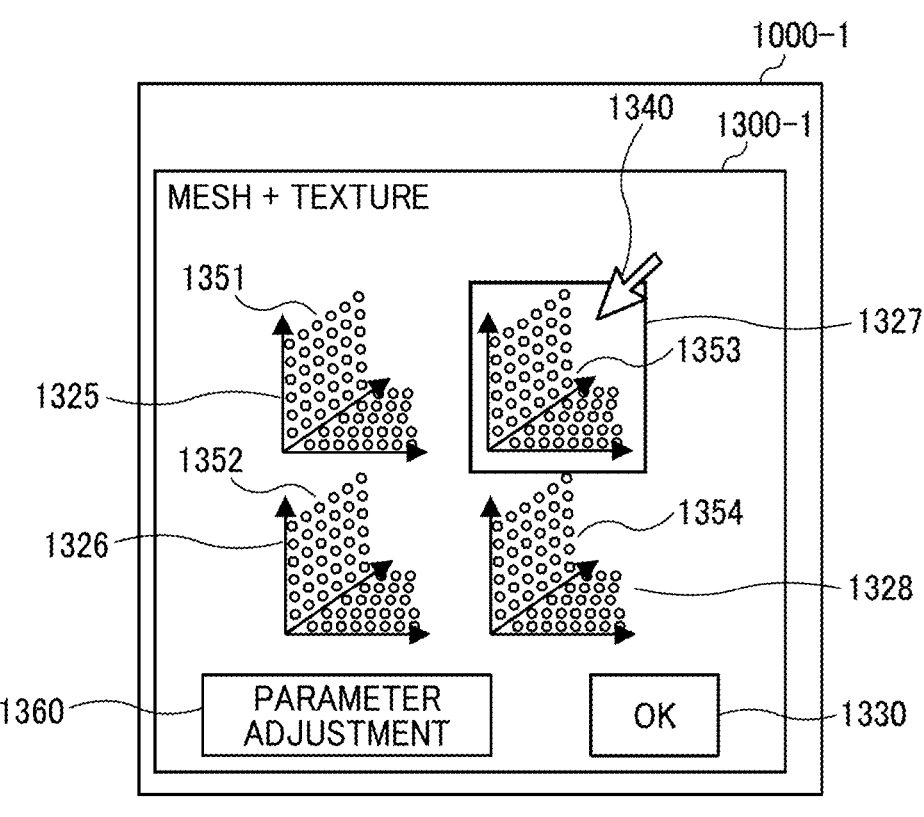
FIG. 13 is a diagram illustrating a selection screen according to a modification of an embodiment of the present disclosure.

FIG. 13 is a diagram illustrating a selection screen according to a modification of the above embodiment of the present disclosure. In FIG. 13, a selection screen 1300-1 is a modification of the selection screen 1300 displayed on the display screen 1000-1 illustrated in FIG. 11A. The selection screen 1300-1 illustrated in FIG. 13 displays selection areas 1325, 1326, 1327, and 1328 in alternative to the selection boxes 1321, 1322, and 1323 illustrated in FIG. 11A.

The selection areas 1325, 1326, 1327, and 1328 serve as options, and visible information items 1351, 1352, 1353, and 1354 are displayed in the selection areas 1325, 1326, 1327, and 1328, respectively. The visible information items 1351, 1352, 1353, and 1354 corresponds to the quality information, and visually display images indicating the plurality of processing results obtained by performing the point cloud processing according to the plurality of quality types. The visible information items 1351 to 1354 allow the user to visually verify the quality information to easily determine which processing result has the quality desired by him or her and to select the quality.

Regarding the visible information items 1351 to 1354, the display control unit 34 may display the processing result obtained by performing the point cloud processing as a two-dimensional image projected on an image from a predetermined angle, may display the processing result as a three-dimensional image viewed by changing the viewpoint with the pointer 1340, or may display the processing result by switching between the two-dimensional image and the three-dimensional image or enlarging the processing result with the pointer 1340.

For example, as illustrated in FIG. 13, when the selection area 1327 is pointed by the pointer 1340, the display control unit 34 displays a frame of the selection area 1327, which is the pointed one, and the reception unit 32 receives a selection operation performed on the selection area 1327 and further accepts the selection operation as a confirmed operation in response to receiving an operation performed on the determination button 1330. The same applies to a case where any one of the selection areas 1325 to 1328 other than the selection area 1327 is pointed by the 1340 and selected.

Then, as described in Step S10 of FIG. 9, the transmission/reception unit 31 transmits the input information including the selection information according to the selection operation received by the reception unit 32 to the management server 5.

Alternatively, when the reception unit 32 receives the selection operation on the selection area 1327 and then receives an operation on the parameter adjustment button 1360, the display control unit 34 switches the screen to the display screen 1000-2 illustrated in FIG. 11B.

Further in the modification illustrated in FIG. 13, the selection screen 1300-1 may additionally display the piece of quality information 1350 in substantially the same manner as the selection screen 1300 illustrated in FIG. 11A.

The case of the selection screen 1300-1 additionally displaying the piece of quality information 1350 allows the user to determine which processing result has the desired quality by checking the visible information items 1351 to 1354 and the piece of quality information 1350 corresponding to each of the selection boxes 1321 to 1323.

Figure 14:
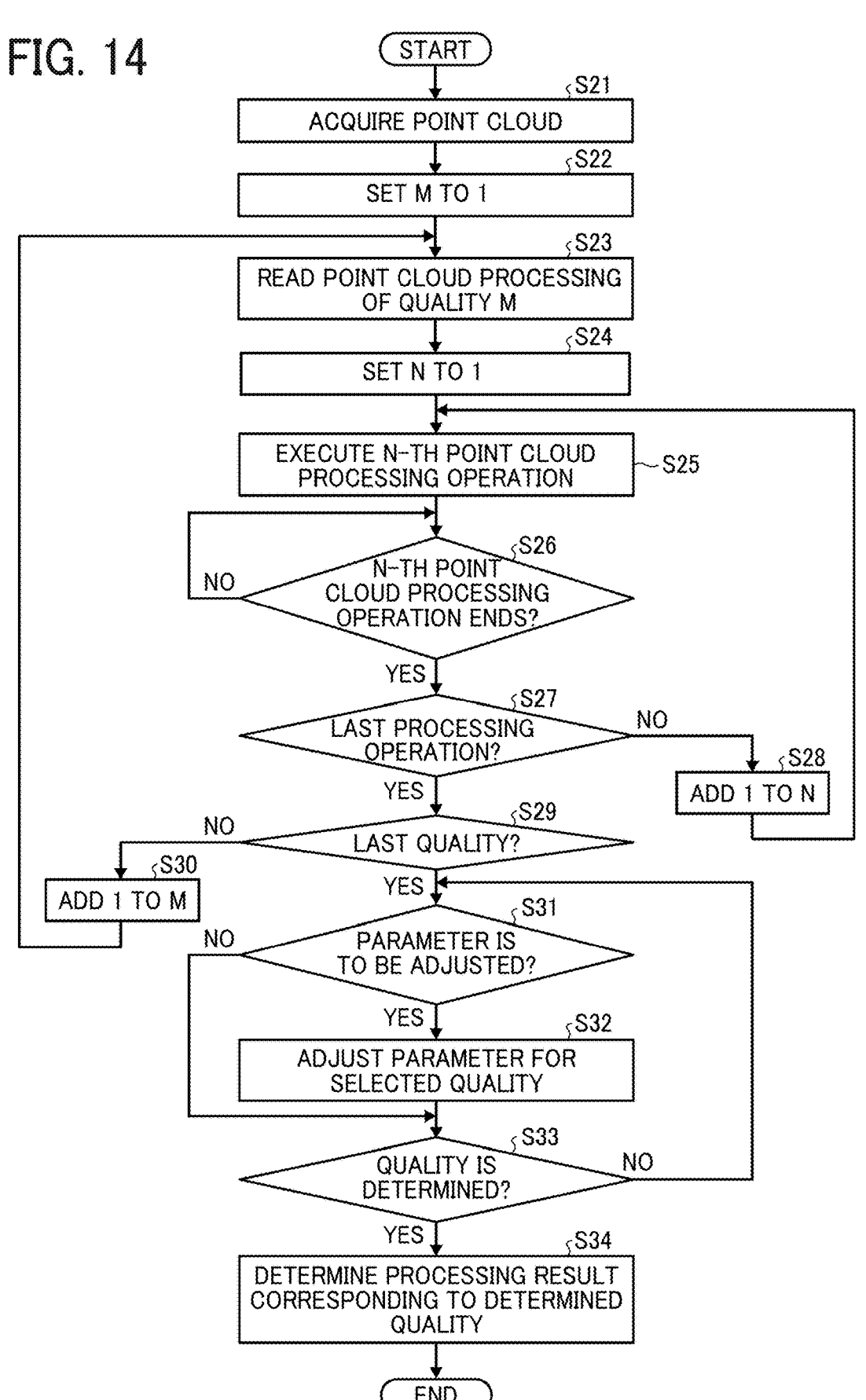
FIG. 14 is a flowchart of point cloud processing according to an embodiment of the present disclosure.

FIG. 14 is a flowchart of performing the point cloud processing according to the present embodiment, and corresponds to the processing of Step S7 in FIG. 9.

The processing unit 53 of the management server 5 acquires three-dimensional point cloud data read by the storing/reading unit 59 (Step S21), and sets an order number M of the quality type to 1, namely sets the quality type, a quality M, to the quality 1 (Step S22).

The storing/reading unit 59 reads from the setting information management DB 5002 a point cloud processing operation name, a quality of the point cloud processing operation, and an order of the point cloud processing operation, with respect to the quality M in a processing result type set on the processing setting screen 1220 (Step S23), and the processing unit 53 sets a processing order N of executing the point cloud processing operation to the processing order 1 (Step S24).

The storing/reading unit 59 reads from the memory management DB 5003 a point cloud processing program for the point cloud processing operation to be executed at the processing order N in the quality M, and the processing unit 53 executes the point cloud processing program, which is read by the storing/reading unit 59, with respect to the three-dimensional point cloud data acquired in Step S21 (Step S25). For example, when the processing result type is set to the merged point cloud, as illustrated in FIG. 4, the first point cloud processing operation (processing order 1) to be executed in the quality 1 is the registration processing.

The determination unit 55 determines whether the point cloud processing operation of the processing order N has ended (Step S26). In the case where the point cloud processing operation of the processing order N has ended, the determination unit 55 further determines whether the point cloud processing operation of the processing order N is the last processing operation (Step S27).

When the determination in Step S27 indicates that the point cloud processing operation is not the last point cloud processing operation, the processing unit 53 adds 1 to the processing order N, which is the processing order number for executing the point cloud processing operation (Step S28), and the process returns to Step S25 to proceed.

When the determination in Step S27 indicates that the point cloud processing operation is the last point cloud processing operation, the determination unit 55 determines whether the quality M is the last quality (Step S29). When the determination in Step S29 indicates that the quality M is not the last quality, the processing unit 53 adds 1 to the order number M of the quality type (Step S30), and the process returns to Step S23 to proceed.

When the determination in Step S29 indicates that the quality is the last quality, the determination unit 55 determines whether the adjustment information indicating a parameter adjusted on the adjustment screen 1500 for the selected quality has been received (Step S31). When the adjustment information has been received, the processing unit 53 performs the point cloud processing with the selected quality again based on the adjustment information indicating the parameter (Step S32).

The determination unit 55 determines whether selection information indicating a piece of quality information selected on the selection screen 1300 has been received (Step S33). When the selection information has been received, the processing unit 53 determines a processing result corresponding to the selected piece of quality information, and the storing/reading unit 59 stores processing result information that is converted into a predetermined format in the processing result management DB 5005, for example (Step S34).

As described above, the processing unit 53 performs the point cloud processing with the quality indicated by each of the plurality of pieces of quality information 1350 for all of the plurality of pieces of quality information 1350 related to the processing result type set on the processing setting screen 1220, and determines the processing result corresponding to the selected one of the plurality of pieces of quality information 1350 among the plurality of processing results obtained by performing the point cloud processing with each of the plurality of pieces of quality information 1350.

Figure 15A:
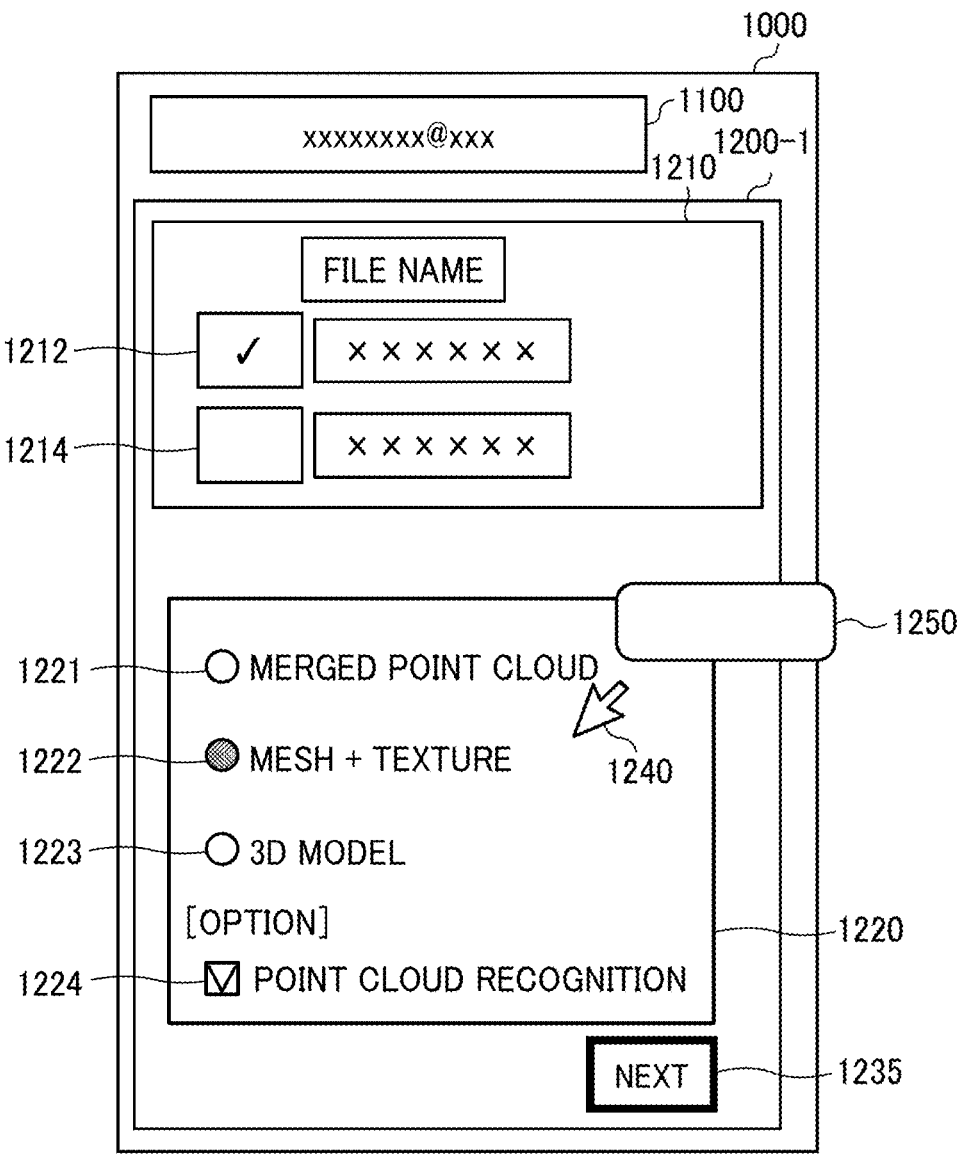
FIGS. 15A to 15C are diagrams each illustrating a setting screen according to a modification of an embodiment of the present disclosure.
Figures 15B, 15C:
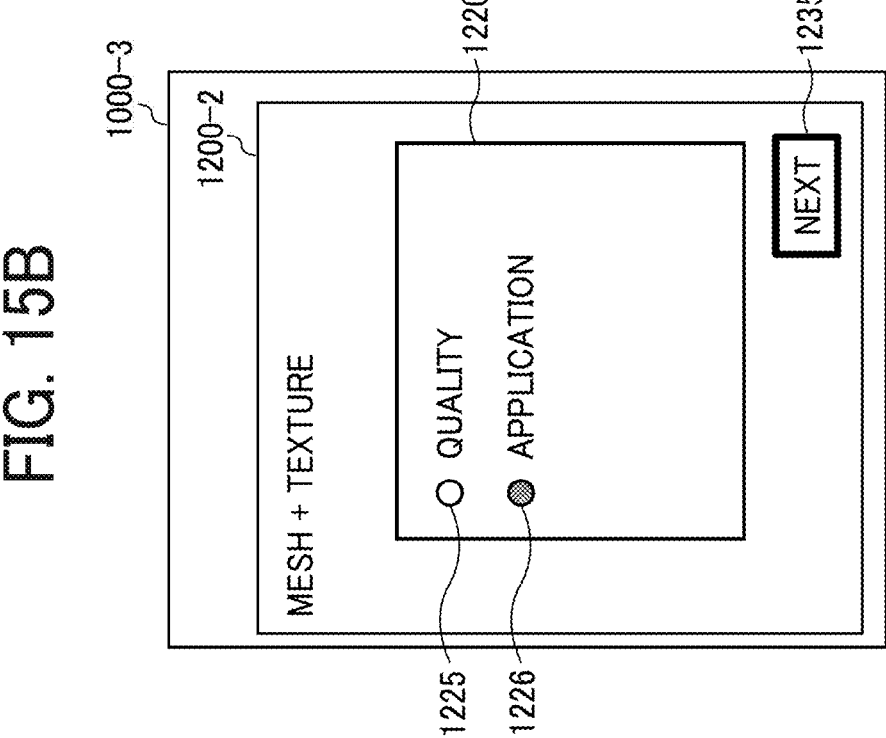

FIGS. 15A to 15C are diagrams each illustrating a setting screen according to a modification of the above embodiment of the preset disclosure.

FIG. 15A is a diagram illustrating a modification of the setting screen 1200 on the display screen 1000 illustrated in FIG. 10. A setting screen 1200-1 illustrated in FIG. 15A displays a transition button 1235 in alternative to the execution button 1230 illustrated in FIG. 10, according to the modification of the above embodiment of the present disclosure.

When the reception unit 32 receives an operation on the transition button 1235 after receiving a selection operation on one of the processing setting boxes 1221 to 1223 and on the option setting box 1224, the display control unit 34 switches the screen to a display screen 1000-3 illustrated in FIG. 15B.

In FIG. 15B, the display control unit 34 displays a setting screen 1200-2 on the display screen 1000-3, and the setting screen 1200-2 includes a processing setting screen 1220-1 and the transition button 1235-1.

In FIG. 15B, the setting screen 1200-2 related to the mesh+texture is illustrated by way of example on the assumption that the processing setting box 1222 corresponding to the mesh+texture is selected on the processing setting screen 1220 illustrated in FIG. 15A.

The processing setting screen 1220-1 is a screen for receiving an operation for setting an option type of the quality information of the point cloud processing, and the display control unit 34 displays option setting boxes 1225 and 1226 each of which is associated with corresponding one of the quality and the application that indicate names of the option types. When the reception unit 32 receives a setting operation on one of the option setting boxes 1225 and 1226 and then receives an operation on the transition button 1235, the display control unit 34 switches the screen to a display screen 1000-4 illustrated in FIG. 15C.

On the display screen 1000-4, the display control unit 34 may display a pointer corresponding to, for example, the mouse 312 for selecting one of the option setting boxes 1225 and 1226. When the pointer is brought close to one of the option selecting boxes 1225 and 1226, the display control unit 34 may further display explanatory information for the corresponding one of the option setting boxes 1225 and 1226 in substantially the same manner as or similar to displaying the piece of processing result type information 1250 as illustrated in FIG. 15A.

For example, when the pointer is brought close to the option setting box 1225, the display control unit 34 displays the explanatory information "SELECT QUALITY OF POINT CLOUD PROCESSING," and when the pointer is brought close to the option setting box 1226, the display control unit 34 displays the explanatory information "SELECT APPLICATION OF PROCESSING RESULT OF POINT CLOUD PROCESSING."

In FIG. 15C, the display control unit 34 displays a setting selection screen 1600 on the display screen 1000-4.

In FIG. 15C, the setting selection screen 1600 related to the application of the mesh+texture in the case where the option setting box 1226 corresponding to the application is selected on the processing setting screen 1220-1 illustrated in FIG. 15B is illustrated by way of example.

The setting selection screen 1600 is a screen for receiving a selection operation for selecting quality information indicating the quality of the point cloud processing. The display control unit 34 displays application selection boxes 1611, 1612, and 1613 that are associated with sharing, measurement, and simulation, respectively, and further displays an execution button 1630 for confirming the selection operation. Each of sharing, measurement, and simulation is a name indicating corresponding one of a plurality of applications.

Further, the display control unit 34 displays a pointer 1640 corresponding to, for example, the mouse 312 for selecting one of the application selection boxes 1611 to 1613. When the pointer 1640 is brought close to one of the application selection boxes 1611 to 1613, the display control unit 34 further displays corresponding quality information indicated by a piece of quality information 1650.

The application selection boxes 1611 to 1613 are used to select one of the plurality of pieces of quality information 1650 that is quality information corresponding to the plurality of applications including sharing, measurement, and simulation.

In other words, the setting selection screen 1600 displays, as options, the plurality of pieces of quality information 1650 indicating the qualities of the point cloud processing. Accordingly, the user can determine which processing result has the desired quality by checking the piece of quality information 1650 corresponding to each of the application selection boxes 1611 to 1613.

The piece of quality information 1350 illustrated in FIG. 11A indicates the quality of the processing result obtained after the point cloud processing is performed, the piece of quality information 1650 illustrated in FIG. 15C indicates the quality of the processing result in advance of performing the point cloud processing.

When any one of the application selection boxes 1611 to 1613 is pointed by the pointer 1640, the display control unit 34 displays a black circle in the one of the application selection boxes 1611 to 1613. When receiving a selection operation and an operation performed on the execution button 1630, the reception unit 32 confirms the selection operation.

Then, as described in Step S6 of FIG. 9, the transmission/reception unit 31 transmits the input information including the selection information according to the selection operation received by the reception unit 32 to the management server 5.

In FIG. 15C, the setting selection screen 1600 related to the application corresponding to the option setting box 1226 indicating "APPLICATION" and selected on the processing setting screen 1220-1 illustrated in FIG. 15B is illustrated by way of example. In substantially the same manner, a setting selection screen corresponding to "QUALITY" is displayed when the option setting box 1225 corresponding to the quality is selected on the processing setting screen 1220-1 illustrated in FIG. 15B.

In the present embodiment, the processing result type is set on the setting screen 1200 illustrated in FIG. 10, the processing unit 53 performs the point cloud processing with the quality indicated by each of the plurality of pieces of quality information 1350 for all of the plurality of pieces of quality information 1350 related to the set processing result type as described with reference to FIG. 14, and determines the processing result corresponding to the selected one piece of the plurality of pieces of quality information 1350, among the plurality of processing results on which the point cloud processing is performed corresponding to the plurality of pieces of quality information 1350.

By contrast, in the setting screen 1200-2 according to the modification of the present embodiment, illustrated in FIGS. 15A to 15C, one of the plurality of pieces of quality information 1650 is selected related to the processing result type, and the processing unit 53 performs the point cloud processing with the quality indicated by the selected one of the plurality of pieces of quality information 1650, but not with the other ones of the plurality of pieces of quality information 1650.

FIG. 16 including FIGS. 16A to 16C is a conceptual diagram illustrating a setting information management table according to the modification illustrated in FIGS. 15A to 15C.

In the setting information management table illustrated in FIG. 4, the plurality of quality types is managed in association with each processing result type, and for each of the plurality of quality types, the point cloud processing operation to be executed and the quality of the point cloud processing operation are managed in association with the order of the point cloud processing operation.

By contrast, in the setting information management table according to the modification illustrated in FIGS. 15A to 15C, the plurality of quality types or the plurality of application types are managed in association with each processing result type, and the point cloud processing operation to be executed and the quality of the point cloud processing operation to be executed are managed in association with the order of the point cloud processing operation for each of the plurality of quality types or each of the plurality of applications.

In the setting information management table according to the modification illustrated in FIGS. 15A to 15C, the following items are managed in addition to the items of the setting information management table illustrated in FIG. 4.

When the processing result type is "MERGED POINT CLOUD" and the application is sharing, the registration processing is executed at the processing order 1, and the noise removal processing with the quality "REMOVAL RATE: LOW" is executed at the processing order 2.

Further, when the processing result type is "MERGED POINT CLOUD" and the application is measurement, the registration processing is executed at the processing order 1, and the noise removal processing with the quality "REMOVAL RATE: HIGH" is executed at the processing order 2.

Further, when the processing result type is "MERGED POINT CLOUD" and the application is simulation, the registration processing is executed at the processing order 1, the segmentation processing with the category "LOADING AND UNLOADING AREA" is executed at the processing order 2, and the noise removal processing with the quality "REMOVAL RATE FOR LOADING AND UNLOADING ARE: HIGH" is executed at the processing order 3.

Further, when the processing result type is "MESH, TEXTURE" and the application is sharing, the registration processing is executed at the processing order 1, the noise removal processing with the quality "REMOVAL RATE: LOW" is executed at the processing order 2, the mesh generation processing with the quality "COMPLETENESS LEVEL: HIGH" is executed at the processing order 3, and the texture mapping processing with the quality "NUMBER OF USED IMAGES: MANY" is executed at the processing order 4.

Further, when the processing result type is "MESH, TEXTURE" and the application is measurement, the registration processing is executed at the processing order 1, the noise removal processing with the quality "REMOVAL RATE: HIGH" is executed at the processing order 2, the mesh generation processing with the quality "COMPLETENESS LEVEL: HIGH" is executed at the processing order 3, and the texture mapping processing with the quality "NUMBER OF USED IMAGES: MANY" is executed at the processing order 4.

Further, when the processing result type is "MESH, TEXTURE" and the application is simulation, the registration processing is executed at the processing order 1, the segmentation processing with the category "LOADING AND UNLOADING AREA" is executed at the processing order 2, the noise removal processing with the quality "REMOVAL RATE FOR LOADING AND UNLOADING AREA: HIGH" is executed at the processing order 3, the mesh generation processing with the quality "COMPLETENESS LEVEL: HIGH" is executed at the processing order 4, and the texture mapping processing with the quality "NUMBER OF USED IMAGES: MANY" is executed at the processing order 5.

Further, when the processing result type is "3D MODEL" and the application is sharing, the registration processing is executed at the processing order 1, the noise removal processing with the quality "REMOVAL RATE: LOW" is executed at the processing order 2, the segmentation processing with the quality "NUMBER OF CATEGORIES MEDIUM" is executed at the processing order 3, and the model fitting processing with the quality "MODEL GENERATION VOLUME: MEDIUM" is executed at the processing order 4. This is because when a generated space is to be presented, a large object, or a significant object, representing the space is modeled.

Further, when the processing result type is "3D MODEL" and the application is measurement, the registration processing is executed at the processing order 1, the noise removal processing with the quality "REMOVAL RATE: LOW" is executed at the processing order 2, the segmentation processing with the quality "NUMBER OF CATEGORIES: FEW" is executed at the processing order 3, and the model fitting processing with the quality "MODEL GENERATION VOLUME: MEDIUM" is executed at the processing order 4. This is because, in the case of measurement, a building frame such as a wall or a column that is likely to be a candidate for a measurement location is completely modeled, and other objects that are unlikely to be candidates for measurement locations are not generated and displayed as models.

Further, when the processing result type is "3D MODEL" and the application is simulation, the registration processing is executed at the processing order 1, the noise removal processing with the quality "REMOVAL RATE: LOW" is executed at the processing order 2, the segmentation processing with the quality "NUMBER OF CATEGORIES: MANY" is executed at the processing order 3, and the model fitting processing with the quality "MODEL GENERATION VOLUME: HIGH" is executed at the processing order 4. This is because, in the case of performing such as an airflow simulation, one or more objects in the space that cause the airflow to be changed are modeled without excess or deficiency.

In the above description, at least one quality type or application among the plurality of quality types or applications corresponding to the quality information indicates a combination of qualities of two or more of the plurality of point cloud processing operations.

In other words, in the present modification of the above-described embodiment of the present disclosure, the quality of each point cloud processing operation used for obtaining the quality of the processing result or the quality for each application is defined, and this can prevent the quality of the processing result or the quality for each application from being degraded even if the quality of each point cloud processing operation is satisfied.

Further, by providing an option for selecting the quality of the processing result or the application, even an unskilled user can easily set the quality as compared with a case where an option for selecting the quality of each point cloud processing operation is provided.

FIG. 17 including FIGS. 17A and 17B is a diagram illustrating the processing result type information and the quality information according to the modification illustrated in FIGS. 15A to 15C.

In the modification illustrated in FIGS. 17A and 17B, the following items are added to the diagram illustrated in FIG. 12.

With respect to an application selection box for selecting the sharing related to the merged point cloud, the quality information is displayed as "NUMBER OF POINTS IS INCREASED TO RAISE VISIBILITY."

With respect to an application selection box for selecting the measurement related to the merged point cloud, the quality information is displayed as "NOISE POINT CLOUD INAPPROPRIATE FOR MEASUREMENT IS REMOVED."

With respect to an application selection box for selecting the simulation related to the merged point cloud, the quality information is displayed as "NOISE AT LOADING AND UNLOADING AREA FOR OBJECT IS PREFERENTIALLY REMOVED."

With respect to the application selection box 1611 for selecting the sharing related to the mesh+texture, the piece of quality information 1650 is displayed as "THERE IS LITTLE SURFACE MISSING AND DISTORTION TO RAISE VISIBILITY."

With respect to the application selection box 1612 for selecting the measurement related to the mesh+texture, the piece of quality information 1650 is displayed as "INAPPROPRIATE NOISE POINT CLOUD IS REMOVED AND MORE ACCURATE SHAPE IS REPRESENTED."

With respect to the application selection box 1613 for selecting the simulation related to the mesh+texture, the piece of quality information 1650 is displayed as "NOISE AT LOADING AND UNLOADING AREA FOR OBJECT IS PREFERENTIALLY REMOVED."

With respect to an application selection box for selecting the sharing related to the 3D model, the quality information is displayed as "SIGNIFICANT OBJECT REPRESENTING SPACE IS MODELED TO RAISE VISIBILITY."

With respect to an application selection box for selecting the measurement related to the 3D model, the quality information is displayed as "ONLY OBJECT(S) USED FOR MEASUREMENT ARE MODELED (FOR EXAMPLE, STRUCTURAL ELEMENTS SUCH AS WALL AND CEILING)."

With respect to an application selection box for selecting the simulation related to the 3D model, the quality information is displayed as "ALL OBJECTS USED FOR SIMULATION ARE MODELED (IN THE CASE OF AIR FLOW SIMULATION, ALL OBJECTS HIT BY AIR FLOW, IN THE CASE OF LOADING AND UNLOADING SIMULATION, ONLY ENTRANCE FOR OBJECTS TO PASS THROUGH."

Figure 18:
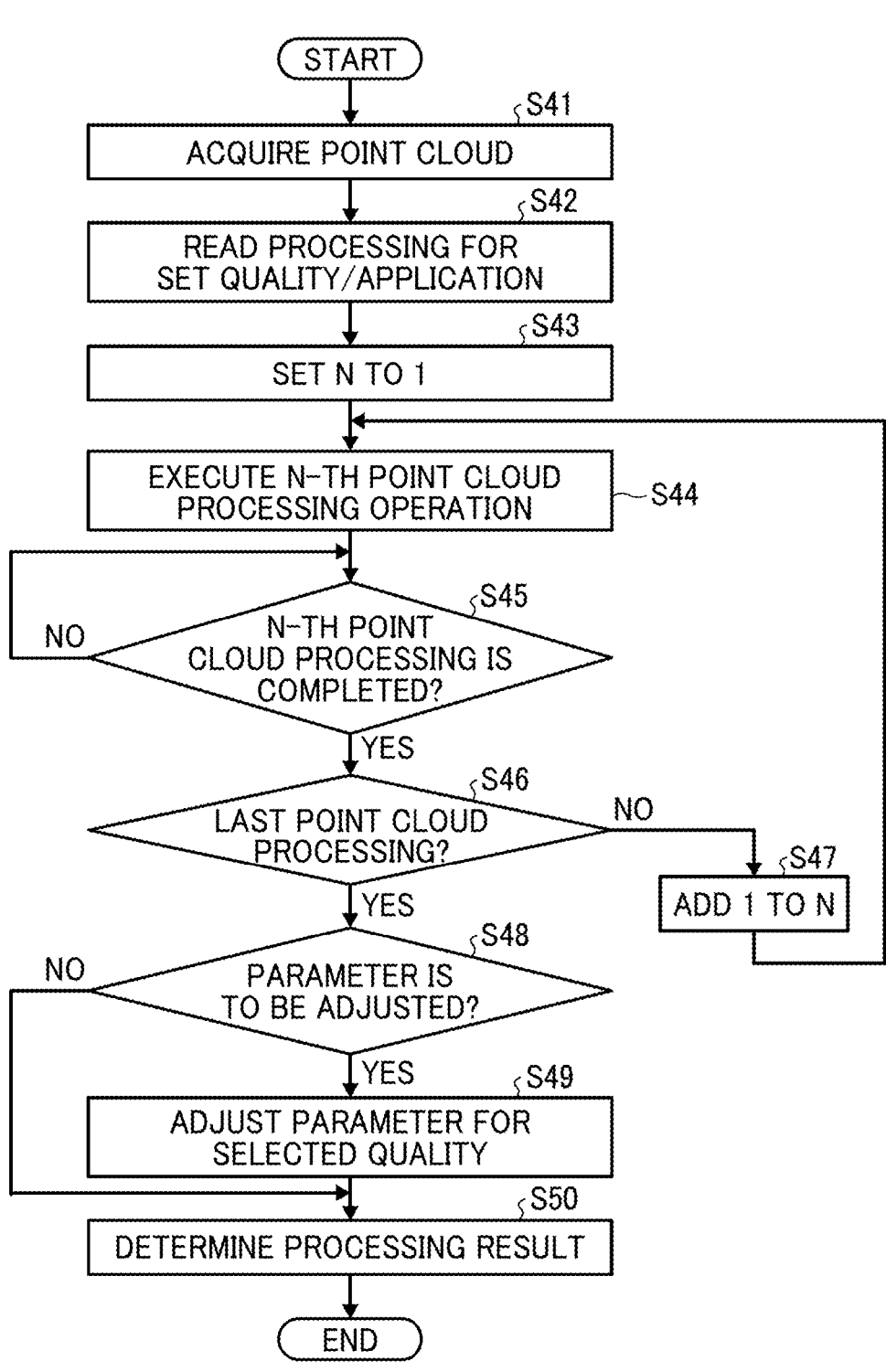
FIG. 18 is a flowchart of point cloud processing according to the modification illustrated in FIGS. 15A to 15C.

FIG. 18 is a flowchart of point cloud processing according to the modification illustrated in FIGS. 15A to 15C.

The processing unit 53 of the management server 5 acquires three-dimensional point cloud data read by the storing/reading unit 59 (Step S41). The storing/reading unit 59 of the management server 5 reads from the setting information management DB 5002 a point cloud processing operation name, a quality of the point cloud processing operation, and an order of the point cloud processing operation, with respect to the quality or the application in relation to the quality information selected on the setting selection screen 1600 (Step S42), and the processing unit 53 sets a processing order N of executing the point cloud processing operation to the processing order 1 (Step S43).

The storing/reading unit 59 reads from the memory management DB 5003 a point cloud processing program for the point cloud processing operation to be executed at the processing order N in the selected quality or application, and the processing unit 53 executes the point cloud processing program, which is read by the storing/reading unit 59, with respect to the three-dimensional point cloud data acquired in Step S41 (Step S44). For example, when the measurement of the mesh+texture is selected as illustrated in FIGS. 15A to 15C, the first point cloud processing operation (processing order 1) to be executed is the registration processing as illustrated in FIG. 16A.

The determination unit 55 determines whether the point cloud processing operation of the processing order N has ended (Step S45). In the case where the point cloud processing operation of the processing order N has ended, the determination unit 55 determines whether the point cloud processing operation of the processing order N is the last processing operation (Step S46).

When the determination in Step S46 indicates that the point cloud processing operation is not the last point cloud processing operation, the processing unit 53 adds 1 to the processing order N, which is the processing order number for executing the point cloud processing operation (Step S47), and the process returns to Step S44 to proceed.

When the determination in Step S46 indicates that the point cloud processing operation is the last point cloud processing operation, the determination unit 55 determines whether parameter adjustment information has been received (Step S48). When the parameter adjustment information has been received, the processing unit 53 performs the point cloud processing again based on the parameter adjustment information indicating the parameter (Step S49). In the present modification, the parameter adjustment information is information generated by an operation in substantially the same manner as or similar to the adjustment operation on the adjustment screen 1500 illustrated in FIG. 11B.

The processing unit 53 determines a processing result corresponding to the quality information of the selected quality or application, and the storing/reading unit 59 stores processing result information that is converted into a predetermined format in the processing result management DB 5005, for example (Step S50).

Aspect 1

As described above, the management server 5, which serves as a point cloud processing apparatus according to an embodiment of the present disclosure, includes the generation unit 57 to generate the selection screen 1300 displaying a plurality of options corresponding to a plurality of qualities for point cloud processing that is performed on point cloud data representing a three-dimensional point cloud, and the storing/reading unit 59 to store in the processing result management DB 5005 a processing result of the point cloud processing performed with a quality that is selected from the plurality of options on the point cloud data.

Aspect 2

In Aspect 1, the selection screen 1300 further displays the quality information 1350 indicating each of the plurality of qualities and including a plurality of pieces of quality information 1350.

The generation unit 57 serves as a generating unit, the processing result management DB 5005 serves as a storage unit, and the storing/reading unit 59 serves as a storage control unit. The selection screen 1300 can receive an operation of selecting a piece of quality information 1350.

Accordingly, even in the case where a user is an unskilled person, the processing result of the point cloud processing performed on the point cloud can be obtained with desired quality by receiving, from the user, an operation of selecting a desired piece of quality information 1350 from the plurality of options corresponding to the plurality of pieces of quality information 1350.

Aspect 3

In Aspect 2, at least one piece of quality information 1350 among the plurality of pieces of quality information 1350 indicates a combination of two or more qualities of corresponding two or more point cloud processing operations among a plurality of point cloud processing operations. The two or more of the plurality of point cloud processing operations are performed as the point cloud processing.

Accordingly, the combination of the qualities of the point cloud processing operations among the plurality of point cloud processing operations can be automatically configured and the processing result of the point cloud processing performed on the point cloud can be obtained with the desired quality by receiving, from the user, an operation of selecting a desired piece of quality information 1350 from the plurality of options corresponding to the plurality of pieces of quality information 1350 without manual configuration for the combination of the qualities of the point cloud processing operations among the plurality of point cloud processing operations.

Aspect 4

In any one of Aspect 1 to Aspect 3, the management server 5 further includes the transmission/reception unit 51 to transmit selection screen information indicating the selection screen 1300 to the terminal apparatus 3, which serves as an external apparatus.

Accordingly, the processing result of the point cloud processing performed on the point cloud can be obtained with the desired quality by receiving, from the user, an operation of selecting a desired piece of quality information

1350 from the plurality of options corresponding to the plurality of pieces of quality information 1350 on the terminal apparatus 3.

Aspect 5

In any one of Aspect 1 to Aspect 4, the point cloud processing includes at least one of the plurality of point cloud processing operations. The plurality of point cloud processing operations includes registration processing for merging point clouds captured at two or more locations, noise removal processing for removing a point cloud determined as noise, mesh generation processing for forming a surface from a point cloud, texture mapping processing for applying RGB values to a mesh object, segmentation processing for identifying a point cloud, point cloud reduction processing for reducing point cloud density, and three-dimensional CAD model conversion processing for converting a point cloud into a three-dimensional CAD model.

Aspect 6

In any one of Aspect 2 to Aspect 5, the selection screen 1300 displays a piece of the quality information 1350 that varies in accordance with each of a plurality of processing types that differ from each other in at least one of the number of point cloud processing operations to be executed, a combination of point cloud processing operations to be executed, and the processing order of the point cloud processing operations to be executed.

Accordingly, the processing result of the point cloud processing performed on the point cloud can be obtained with desired quality by receiving, from the user, an operation of selecting a desired piece of quality information 1350 from the plurality of options corresponding to the plurality of pieces of quality information 1350 that has different contents according to each of the plurality of processing types that differ from each other in the terms of the number of point cloud processing operations to be executed, a combination of point cloud processing operations to be executed, or the processing order of point cloud processing operations to be executed.

Aspect 7

In Aspect 6, the generation unit 57 further generates the setting screen 1200 on which a plurality of pieces of processing result type information 1250 indicating types of processing results of the plurality of processing types is displayed as a plurality of options.

Accordingly, the plurality of options corresponding to the plurality of pieces of quality information 1350 related to a desired processing result type can be displayed by receiving, from the user, an operation of selecting a desired piece of processing result type information 1250 from the plurality of options corresponding to the plurality of pieces of processing result type information 1250.

Aspect 8

In Aspect 7, the plurality of pieces of processing result type information 1250 includes at least two of a merged point cloud, a mesh object, a textured mesh object, and a three-dimensional CAD model.

Aspect 9

In any one of Aspect 1 to Aspect 8, the processing unit 53 performs the point cloud processing with a quality indicated by each of the plurality of pieces of quality information 1350 for all of the plurality pieces of quality information 1350, and the storing/reading unit 59 stores, in the processing result management DB 5005, the processing result corresponding to the selected piece of quality information 1350, among the plurality of processing results obtained by performing the point cloud processing corresponding to the plurality of pieces of quality information 1350. The processing unit 53 serves as a point cloud processing unit.

Accordingly, the processing result of the point cloud processing performed on the point cloud can be obtained with desired quality, from among the plurality of processing results obtained by performing the point cloud processing corresponding to the plurality pieces of quality information 1350, by receiving, from the user, an operation of selecting a desired piece of quality information 1350, by using the plurality of options corresponding to the plurality of pieces of quality information 1350.

Aspect 10

In Aspect 9, the plurality of pieces of quality information includes the visible information items 1351 to 1354 each of which visually displays an image indicating a corresponding processing result.

The visible information items 1351 to 1354 allow the user to visually verify the quality information and easily determine which processing result has the quality desired by him or her.

Aspect 11

In any one of Aspect 2 to Aspect 8, the pieces of quality information 1650 indicates a quality of a processing result in advance of performing the point cloud processing, and the processing unit 53 performs the point cloud processing with a quality indicated by the selected piece of quality information 1650 among the plurality of pieces of quality information 1650.

Accordingly, the point cloud processing to be performed in order to obtain a processing result with desired quality can be performed by receiving, from a user, an operation of selecting a desired one of the plurality of pieces of quality information 1650 from the plurality of options corresponding to the plurality of pieces of the quality information 1650 in advance of performing the point cloud processing.

Aspect 12

In any one of Aspect 9 to Aspect 11, the processing unit 53 performs the point cloud processing again based on an adjustment operation performed on the adjustment screen 1500 for adjusting the processing result of the point cloud processing.

Aspect 13

A point cloud processing method according to an embodiment of the present disclosure includes a generation step (Step S8) of generating the selection screen 1300 displaying a plurality of options corresponding to a plurality of qualities for point cloud processing that is performed on point cloud data representing a three-dimensional point cloud, and a storage step (Step S11) of storing, in a processing result management DB 5005, a processing result of the point cloud processing performed with a quality selected from the plurality of options on the point cloud data.

Aspect 14

A program according to an embodiment of the present disclosure causes a computer to execute the point cloud processing method according to Aspect 13.

Aspect 15

The point cloud processing system 1 includes the management server 5 that performs one or more of the point cloud processing operations on point cloud data representing a three-dimensional point cloud and the terminal apparatus 3 that is connected to the management server 5 to communicate with the management server 5. The management server 5 includes a generation unit 57 to generate the selection screen 1300 displaying a plurality of options corresponding to a plurality of qualities for the point cloud processing, and the transmission/reception unit 51 to transmit selection screen 1300 information indicating the selection screen 1300 to the terminal apparatus 3, and the terminal apparatus 3 includes the transmission/reception unit 31 to receive the selection screen 1300 information transmitted from the management server 5, and the display control unit 34 to display the selection screen 1300 on the display 308.

According to an embodiment of the present disclosure, a processing result of point cloud processing performed on point cloud data can be obtained with the desired quality.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A point cloud processing apparatus, comprising circuitry configured to:

generate a selection screen displaying a plurality of options each of which indicates a corresponding one of a plurality of qualities for point cloud processing that is performed on point cloud data representing a three-dimensional point cloud; and store, in a memory, a processing result of the point cloud processing performed with one of the plurality of qualities on the point cloud data, the one of the plurality of qualities being a selected one of the plurality of options, wherein the selection screen displays each of a plurality of pieces of quality information which indicates one of the plurality of qualities, and the selection screen displays the each of the plurality of pieces of quality information that varies according to a combination of two or more qualities of corresponding two or more of a plurality of point cloud processing operations, or according to each of a plurality of processing types, the plurality of processing types differing from each other in at least one of a number of the point cloud processing operations to be executed, a combination of the point cloud processing operations to be executed, or an order of the point cloud processing operations to be executed.

2. The point cloud processing apparatus of claim 1, wherein the two or more of the plurality of point cloud processing operations are performed as the point cloud processing.

3. The point cloud processing apparatus of claim 1, wherein the circuitry is further configured to transmit selection screen information indicating the selection screen to an external apparatus.

4. The point cloud processing apparatus of claim 1, wherein the point cloud processing includes at least one of the plurality of point cloud processing operations, the plurality of point cloud processing operations being registration processing that merges point clouds captured at two or more locations, noise removal processing that removes a point cloud determined as noise, mesh generation processing that forms a surface from a point cloud, texture mapping processing that applies RGB values to a mesh object, segmentation processing that identifies a point cloud, point cloud reduction processing that reduces point cloud density, and three-dimensional Computer Aided Design (CAD) model conversion processing that converts a point cloud into a three-dimensional CAD model.

5. The point cloud processing apparatus of claim 1, wherein the circuitry is further configured to generate a setting screen on which a plurality of pieces of processing result type information is displayed as the plurality of options in a case in which the selection screen displays the each of the plurality of pieces of quality information that varies according to the each of the plurality of processing types, each of the plurality of pieces of processing result type information indicating one of a plurality of processing result types of the plurality of processing types.

6. The point cloud processing apparatus of claim 5, wherein the plurality of processing result types includes at least two of a merged point cloud, a mesh object, a textured mesh object, or a three-dimensional CAD model.

7. The point cloud processing apparatus of claim 1, wherein the circuitry is further configured to:

perform the point cloud processing with a quality indicated by each of the plurality of pieces of quality information for all of the plurality of pieces of quality information; and store, in the memory, the processing result corresponding to the selected one of the plurality of pieces of quality information, from among a plurality of processing results obtained by performing the point cloud processing corresponding to the plurality of pieces of quality information.

8. The point cloud processing apparatus of claim 7, wherein the plurality of pieces of quality information includes visible information for visually displaying an image indicating the processing result.

9. The point cloud processing apparatus of claim 1, wherein each of the plurality of pieces of quality information indicates, in advance of performing the point cloud processing, a quality of the processing result, and the circuitry is further configured to perform the point cloud processing with a quality indicated by one of the plurality of pieces of quality information, the one of the plurality of pieces of quality information corresponding to the selected one.

10. The point cloud processing apparatus of claim 7, wherein the circuitry is further configured to perform the point cloud processing again based on a received adjustment operation of adjusting the processing result of the point cloud processing.

11. A point cloud processing system, comprising:

the point cloud processing apparatus of claim 1; and a terminal apparatus communicably connected to the point cloud processing apparatus, the circuitry of the point cloud processing apparatus is further configured to transmit selection screen information indicating the selection screen to the terminal apparatus, the terminal apparatus including additional circuitry configured to:

receive the selection screen information transmitted from the point cloud processing apparatus; and display, on a display, the selection screen.

12. A point cloud processing method, comprising:

generating a selection screen displaying a plurality of options each of which indicates a corresponding one of a plurality of qualities for point cloud processing that is performed on point cloud data representing a three-dimensional point cloud; and storing a processing result of the point cloud processing performed with one of the plurality of qualities on the point cloud data, the one of the plurality of qualities being a selected one of the plurality of options, wherein the selection screen displays each of a plurality of pieces of quality information which indicates one of the plurality of qualities, and the selection screen displays the each of the plurality of pieces of quality information that varies according to a combination of two or more qualities of corresponding two or more of a plurality of point cloud processing operations, or according to each of a plurality of processing types, the plurality of processing types differing from each other in at least one of a number of the point cloud processing operations to be executed, a combination of the point cloud processing operations to be executed, or an order of the point cloud processing operations to be executed.

13. A non-transitory recording medium storing a plurality of instructions which, when executed by one or more processors, causes the one or more processors to perform a method, the method comprising:

generating a selection screen displaying a plurality of options each of which indicates a corresponding one of a plurality of qualities for point cloud processing that is performed on point cloud data representing a three-dimensional point cloud; and storing a processing result of the point cloud processing performed with one of the plurality of qualities on the point cloud data, the one of the plurality of qualities being a selected one of the plurality of options, wherein the selection screen displays each of a plurality of pieces of quality information which indicates one of the plurality of qualities, and the selection screen displays the each of the plurality of pieces of quality information that varies according to a combination of two or more qualities of corresponding two or more of a plurality of point cloud processing operations, or according to each of a plurality of processing types, the plurality of processing types differing from each other in at least one of a number of the point cloud processing operations to be executed, a combination of the point cloud processing operations to be executed, or an order of the point cloud processing operations to be executed.

14. The non-transitory recording medium of claim 13, wherein the two or more of the plurality of point cloud processing operations are performed as the point cloud processing.

15. The non-transitory recording medium of claim 13, wherein the point cloud processing includes at least one of the plurality of point cloud processing operations, the plurality of point cloud processing operations being registration processing that merges point clouds captured at two or more locations, noise removal processing that removes a point cloud determined as noise, mesh generation processing that forms a surface from a point cloud, texture mapping processing that applies RGB values to a mesh object, segmentation processing that identifies a point cloud, point cloud reduction processing that reduces point cloud density, and three-dimensional Computer Aided Design (CAD) model conversion processing that converts a point cloud into a three-dimensional CAD model.

16. The non-transitory recording medium of claim 13, wherein the method further comprises generating a setting screen on which a plurality of pieces of processing result type information is displayed as the plurality of options in a case in which the selection screen displays the each of the plurality of pieces of quality information that varies according to the each of the plurality of processing types, each of the plurality of pieces of processing result type information indicating one of a plurality of processing result types of the plurality of processing types.

17. The non-transitory recording medium of claim 13, wherein the method further comprises:

performing the point cloud processing with a quality indicated by each of the plurality of pieces of quality information for all of the plurality of pieces of quality information; and storing, in the memory, the processing result corresponding to the selected one of the plurality of pieces of quality information, from among a plurality of processing results obtained by performing the point cloud processing corresponding to the plurality of pieces of quality information.

18. The non-transitory recording medium of claim 17, wherein the plurality of pieces of quality information includes visible information for visually displaying an image indicating the processing result.

19. The non-transitory recording medium of claim 13, wherein each of the plurality of pieces of quality information indicates, in advance of performing the point cloud processing, a quality of the processing result, and the method further comprises performing the point cloud processing with a quality indicated by one of the plurality of pieces of quality information, the one of the plurality of pieces of quality information corresponding to the selected one.

20. The non-transitory recording medium of claim 17, wherein the method further comprises performing the point cloud processing again based on a received adjustment operation of adjusting the processing result of the point cloud processing.

\* \* \* \* \*